US010914350B2

(12) United States Patent
Noguchi et al.

(10) Patent No.: US 10,914,350 B2
(45) Date of Patent: Feb. 9, 2021

(54) OPPOSED-PISTON TYPE DISC BRAKE DEVICE

(71) Applicant: AKEBONO BRAKE INDUSTRY CO., LTD., Tokyo (JP)

(72) Inventors: Tetsuya Noguchi, Tokyo (JP); Hiroyuki Kato, Tokyo (JP); Takayuki Ichige, Tokyo (JP); Yoshio Totsuka, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/440,198

(22) Filed: Jun. 13, 2019

(65) Prior Publication Data

US 2019/0383336 A1 Dec. 19, 2019

(30) Foreign Application Priority Data

Jun. 14, 2018 (JP) ................................. 2018-113725

(51) Int. Cl.
*F16D 55/227* (2006.01)
*F16D 55/228* (2006.01)
(Continued)

(52) U.S. Cl.
CPC ......... *F16D 55/227* (2013.01); *F16D 55/228* (2013.01); *F16D 2121/04* (2013.01); *F16D 2121/24* (2013.01); *F16D 2125/40* (2013.01)

(58) Field of Classification Search
CPC ..................... B60T 13/58; B60T 13/74; F16D 55/226–228; F16D 65/18; F16D 65/38; F16D 65/40; F16D 65/183
(Continued)

(56) References Cited

U.S. PATENT DOCUMENTS

2002/0003067 A1  1/2002  Iwata et al.
2007/0029144 A1  2/2007  Sekiguchi
(Continued)

FOREIGN PATENT DOCUMENTS

EP    3 287 657 A1    2/2018
JP    H09-60667 A     3/1997
(Continued)

OTHER PUBLICATIONS

Extended European Search Report issued in European Patent Application No. 19179840.4 dated Dec. 11, 2019.

*Primary Examiner* — Christopher P Schwartz
(74) *Attorney, Agent, or Firm* — Faegre Drinker Biddle & Reath LLP

(57) ABSTRACT

An opposed-piston type disc brake includes a guide cylinder extending axially inward from an opening edge portion of a cylinder in which an outer displacement member of a thrust generating mechanism is disposed is provided in an inner body of a caliper at an axial inner side portion of the inner body. A clamp base portion of a clamp member of a parking mechanism portion includes a housing hole opened to an axial outer side of the clamp base portion in which an inner side displacement member of the thrust generating member is disposed. A guide cylinder extending axially inward from an opening edge portion of the cylinder is fitted into the housing hole so as to relatively move in the axial direction, to form a first guide portion which supports the clamp member so that the clamp member is displaced relative to the cylinder in the axial direction.

16 Claims, 18 Drawing Sheets

(51) Int. Cl.
*F16D 121/04* (2012.01)
*F16D 121/24* (2012.01)
*F16D 125/40* (2012.01)

(58) Field of Classification Search
USPC .............................. 188/71.7–72.8, 156–164
See application file for complete search history.

(56) References Cited

U.S. PATENT DOCUMENTS

| | | | |
|---|---|---|---|
| 2012/0292137 A1* | 11/2012 | Yoshikawa | F16D 65/18 |
| | | | 188/71.7 |
| 2012/0292141 A1 | 11/2012 | Takahashi | |
| 2013/0075205 A1* | 3/2013 | Sakashita | F16D 65/18 |
| | | | 188/72.3 |
| 2017/0130788 A1 | 5/2017 | Noguchi et al. | |
| 2018/0058524 A1* | 3/2018 | Suzuki | F16D 65/183 |
| 2020/0217379 A1* | 7/2020 | Odaira | F16D 65/183 |
| 2020/0256414 A1* | 8/2020 | Gerber | F16H 25/20 |

FOREIGN PATENT DOCUMENTS

| | | |
|---|---|---|
| JP | 2002-21892 A | 1/2002 |
| JP | 2007-177995 A | 7/2007 |
| JP | 2011-158058 A | 8/2011 |
| JP | 2015-194165 A | 11/2015 |
| WO | WO-2015/098780 A1 | 7/2015 |

\* cited by examiner

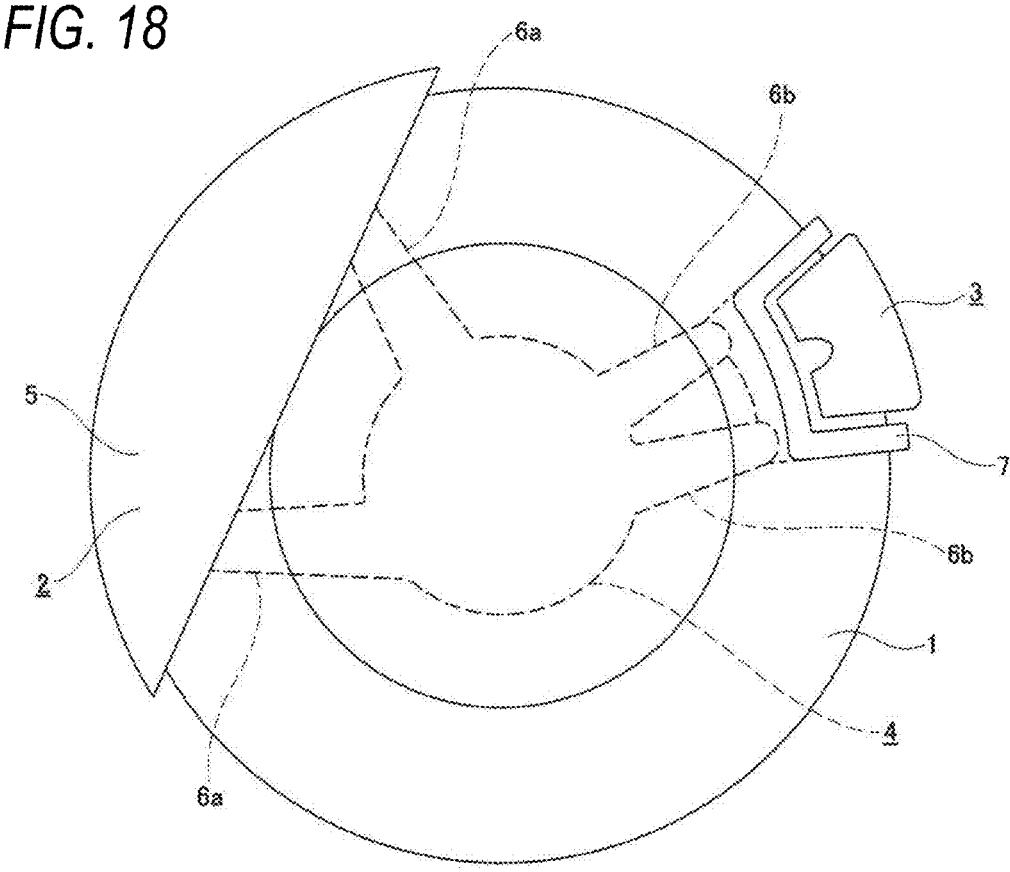
FIG. 18
CONVENTIONAL

OPPOSED-PISTON TYPE DISC BRAKE DEVICE

CROSS REFERENCE TO RELATED APPLICATIONS

This application is based on Japanese Patent Application (No. 2018-113725) filed on Jun. 14, 2018, the contents of which are incorporated herein by way of reference.

BACKGROUND

The present invention relates to an opposed-piston type disc brake device used for braking a vehicle.

A disc brake device may be used for performing a service brake not only on a front wheel but also on a rear wheel of an automobile for reasons of being excellent in heat dissipation and allowing fine adjustments of a braking force during traveling. When the disc brake device is used for a service brake, a brake device used for the service brake is disposed separately from a brake device used for a parking brake.

For example, JP-A-9-60667 and JP-A-2002-21892 disclose a so-called drum-in-hat structure in which a drum brake device dedicated to a parking brake is disposed on a radial inner side of a disc brake device dedicated to a service brake. Further, a so-called twin caliper structure is also known in which a disc brake device dedicated to a service brake is disposed separately from a disc brake device dedicated to a parking brake.

FIG. 18 is a schematic view of a conventional structure in which a disc brake device dedicated to a service brake and a disc brake device dedicated to a parking brake are separately disposed. In the illustrated structure, an opposed-piston type disc brake device 2 dedicated to the service brake and a floating disc brake device 3 dedicated to the parking brake are separately disposed in a circumferential direction around a rotor 1 that rotates with a wheel. The opposed-piston type disc brake device 2 and the floating disc brake device 3 are supported and fixed to a knuckle 4 constituting a suspension device. Specifically, a caliper 5 constituting the opposed-piston type disc brake device 2 is supported and fixed to a mounting portion (stay) 6a provided in the knuckle 4, and a support 7 constituting the floating disc brake device 3 is supported and fixed to another mounting portion 6b provided in the knuckle 4.

Terms "axial", "radial" and "circumferential" throughout the specification and the claims refer to axial, radial, and circumferential directions of a rotor unless otherwise specified.

Patent Document 1: JP-A-9-60667
Patent Document 2: JP-A-2002-21892
Patent Document 3: JP-A-2015-194165
Patent Document 4: JP-A-2007-177995
Patent Document 5: JP-A-2011-158058

SUMMARY

According to an aspect according to the present invention, there is provided an opposed-piston type disc brake device including:

a caliper including an outer body and an inner body which are disposed on two sides of a rotor in an axial direction of the rotor and in which cylinders are respectively provided, and a pair of coupling portions which connect two circumferential side portions of the outer body and the inner body, and configured to be fixed to a suspension device;

a plurality of pistons respectively fitted in the cylinders;

a pair of pads, disposed on two sides of the rotor in the axial direction, and supported so as to be displaced relative to the caliper in the axial direction; and a parking mechanism portion including a clamp member and a thrust generating mechanism, wherein the clamp member includes a pressing portion on an axial outer side portion and a clamp base portion on an axial inner side portion, the clamp member is disposed between the pair of coupling portions in a circumferential direction, crosses the pair of pads and the inner body provided between the pressing portion and the clamp base portion from radially outside, and is supported to the caliper so as to be displaced relative to the caliper in the axial direction, the thrust generating mechanism includes an inner displacement member which is supported on the clamp base portion and is configured to be displaced axially inwardly relative to the caliper during braking operation, and an outer displacement member which is disposed in one of the cylinders provided in the inner body and is configured to be displaced axially outward relative to the caliper during braking operation, the cylinders are configured to receive a pressure oil so that a braking force by a service brake is generated, and the thrust generating mechanism is configured to be operated so that a braking force by a parking brake is generated, and a guide cylinder extending axially inward from an opening edge portion of the cylinder in which the outer displacement member is disposed is provided in the inner body at an axial inner side portion of the inner body, the clamp base portion includes a housing hole opened to an axial outer side of the clamp base portion in which the inner side displacement member is disposed, and the guide cylinder is fitted into the housing hole so as to relatively move in the axial direction, to form a first guide portion which supports the clamp member so that the clamp member is displaced relative to the cylinder in the axial direction.

The guide cylinder, the inner displacement member, and the outer displacement member may be coaxial with each other.

The opposed-piston type disc brake device may be configured such that:

the inner displacement member is a spindle having a male screw portion on an outer peripheral surface, and the outer displacement member is a nut having a female screw portion on an inner peripheral surface and screwed to the spindle.

The opposed-piston type disc brake device may further include an elastic ring interposed between an outer peripheral surface of the guide cylinder and an inner peripheral surface of the housing hole.

The opposed-piston type disc brake device may further include a dust cover bridged between the outer peripheral surface of the guide cylinder and an opening of the housing hole.

The opposed-piston type disc brake device may further include a second guide portion disposed in a position deviated from the first guide portion in the circumferential direction, wherein the second guide portion supports the clamp member so that the clamp member is displaced relative to the caliper in the axial direction together with the first guide portion, and includes an inner guide pin disposed between the inner body and the clamp base portion in the axial direction.

The inner guide pin may be fixed to one of the inner body and the clamp base portion, and be slidably inserted into another one of the inner body and the clamp base portion.

The inner guide pin may be slidably inserted into the other one of the inner body and the clamp base portion via a sleeve.

The opposed-piston type disc brake device may be configured such that:

the caliper includes an intermediate coupling portion that axially connects a circumferential intermediate portion of the outer body and a circumferential intermediate portion of the inner body, and the inner guide pin is fixed at a same position as the intermediate coupling portion in the circumferential direction.

The opposed-piston type disc brake device may further include a third guide portion, wherein the third guide portion supports the clamp member so that the clamp member is displaced relative to the caliper in the axial direction together with the first guide portion, and includes an outer guide pin disposed between the outer body and the pressing portion in the axial direction.

The third guide portion may be disposed at a same position as the first guide portion in the circumferential direction.

The outer guide pin may be fixed to one of the outer body and the pressing portion, and be slidably inserted into another one of the outer body and the pressing portion.

The outer guide pin may be slidably inserted into the other one of the outer body and the pressing portion via an elastic body.

The opposed-piston type disc brake device may be configured such that:

the clamp base portion includes a through hole communicated to the housing hole from an outer peripheral surface of the clamp base portion, and an opening of the through hole opened to the outer peripheral surface of the clamp base portion is closed by a stopper.

The opposed-piston type disc brake device may be configured such that:

the clamp member includes a bridge portion which is disposed on a radial outer side of the rotor and connects the pressing portion and the clamp base portion in the axial direction, and the bridge portion and the pressing portion are formed separately from each other.

The clamp base portion may include an electric drive device configured to operate the thrust generating mechanism.

BRIEF DESCRIPTION OF DRAWINGS

FIG. 18 is a schematic view illustrating a brake device having a conventional structure for exhibiting two functions including a service brake and a parking brake.

DETAILED DESCRIPTION OF EXEMPLIFIED EMBODIMENTS

Figure 1:
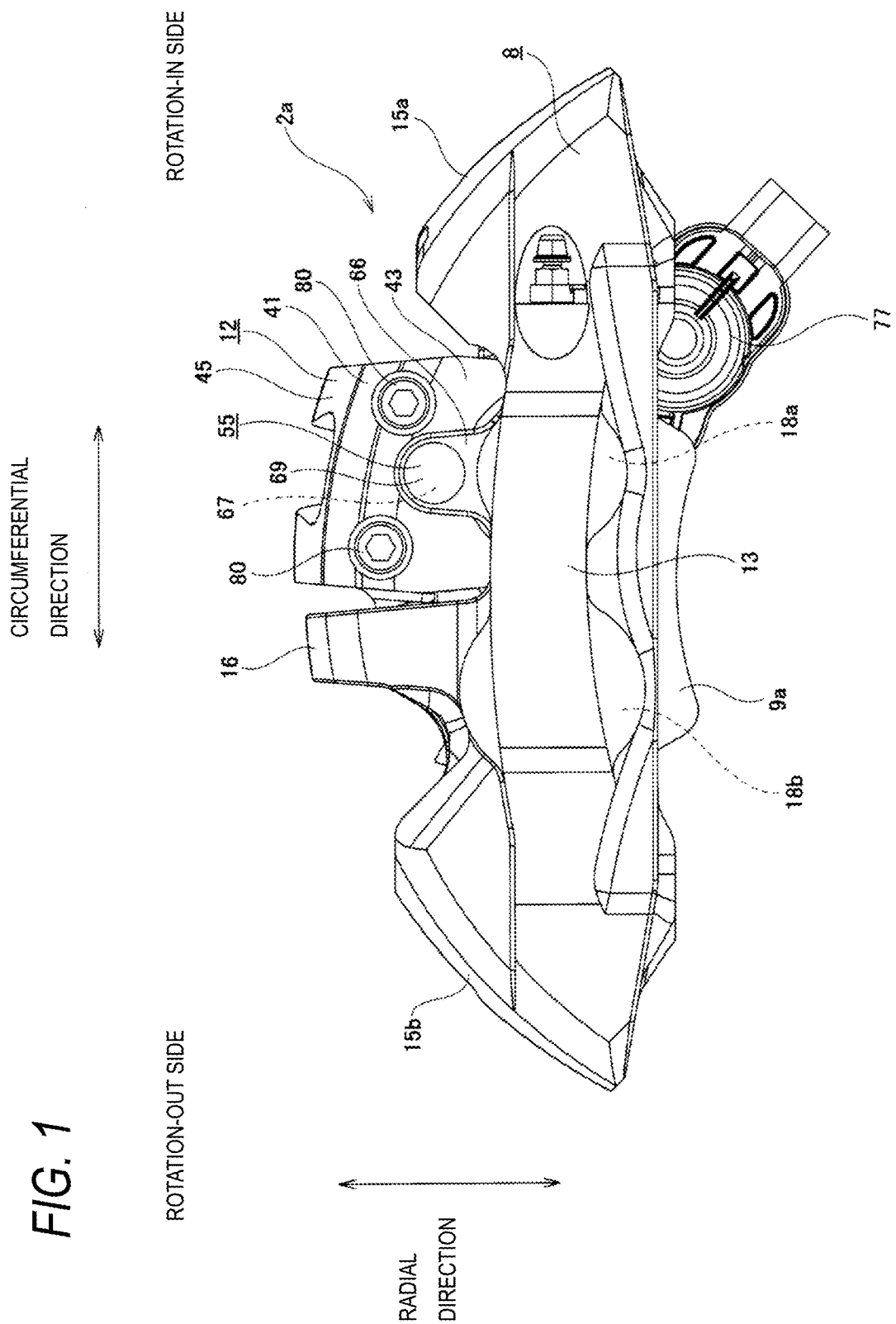
FIG. 1 is a front view illustrating a disc brake device according to a first embodiment.

In the structure described above, the opposed-piston type disc brake device 2 dedicated to the service brake and the floating disc brake device 3 dedicated to the parking brake are separately disposed. Therefore, when the structure is viewed as one brake device having two functions including the service brake and the parking brake, an overall size of the device is large and an overall weight thereof is inevitably heavy. Further, a degree of freedom of a shape of the knuckle 4 is low since the knuckle 4 needs to be provided with mounting portions 6a and 6b. It is necessary for a knuckle to be separately provided with a mounting portion for fixing a damper, a mounting portion for fixing a lower arm, and the like. Accordingly, it is important to ensure a degree of freedom of a shape of the knuckle to ensure a degree of freedom of design of members around the knuckle.

In view of such circumstances, JP-A-2015-194165 discloses a structure in which a parking mechanism portion such as a floating caliper that functions as a parking brake is combined with an opposed-piston type disc brake device that functions as a service brake. According to such a structure, it is possible to exhibit two functions of the service brake and the parking brake with a single device. Therefore, as compared with a case of providing dedicated devices separately, a size and a weight of the overall device can be reduced and a degree of freedom of a shape of a suspension device can be improved.

In the structure described in JP-A-2015-194165, a clamp member constituting the parking mechanism portion is displaced (moved in parallel) axially relative to a caliper constituting the opposed-piston type disc brake device during the parking brake, and a pair of pads is pressed against both side surfaces in an axial direction of a rotor to obtain a braking force. Therefore, it is important to support the clamp member to the caliper so that the displacement in the axial direction can be smoothly performed. When the support to the caliper is unstable, an inclination of the clamp member in a radial direction or a circumferential direction is likely to increase since the clamp member is mounted on the caliper and has a large axial dimension. When the clamp member is inclined, twists or dragging may occur in an internal component and the like of the parking mechanism portion during the parking brake, and it is difficult to stably obtain the braking force.

The present invention is made in view of the above circumstances, and an object thereof is to realize a support structure for a clamp member of a disc brake device having two functions including a service brake and a parking brake by mounting a caliper constituting an opposed-piston type disc brake device on a clamp member, which enables a smooth axial displacement of the clamp member relative to the caliper.

First Embodiment

The first embodiment is described with reference to FIGS. 1 to 17. An opposed-piston type disc brake device 2a in the present embodiment has two functions including a service brake and a parking brake and includes a caliper 8 fixed to a suspension device, a pair of pads 9a, and 9b (outer pad 9a, and inner pad 9b), four pistons 10, and 11 (one dual-purpose piston 10, and three service-dedicated pistons 11), and a parking mechanism portion 12 supported on the caliper 8.

The opposed-piston type disc brake device 2a feeds pressure oil into all (four) cylinders 18a, 18b, 19a, and 19b provided in the caliper 8, so as to obtain a braking force by the service brake. In contrast, the opposed-piston type disc brake device 2a obtains a braking force by the parking brake by mechanically driving the parking mechanism portion 12 without using hydraulic oil.

Figure 2:
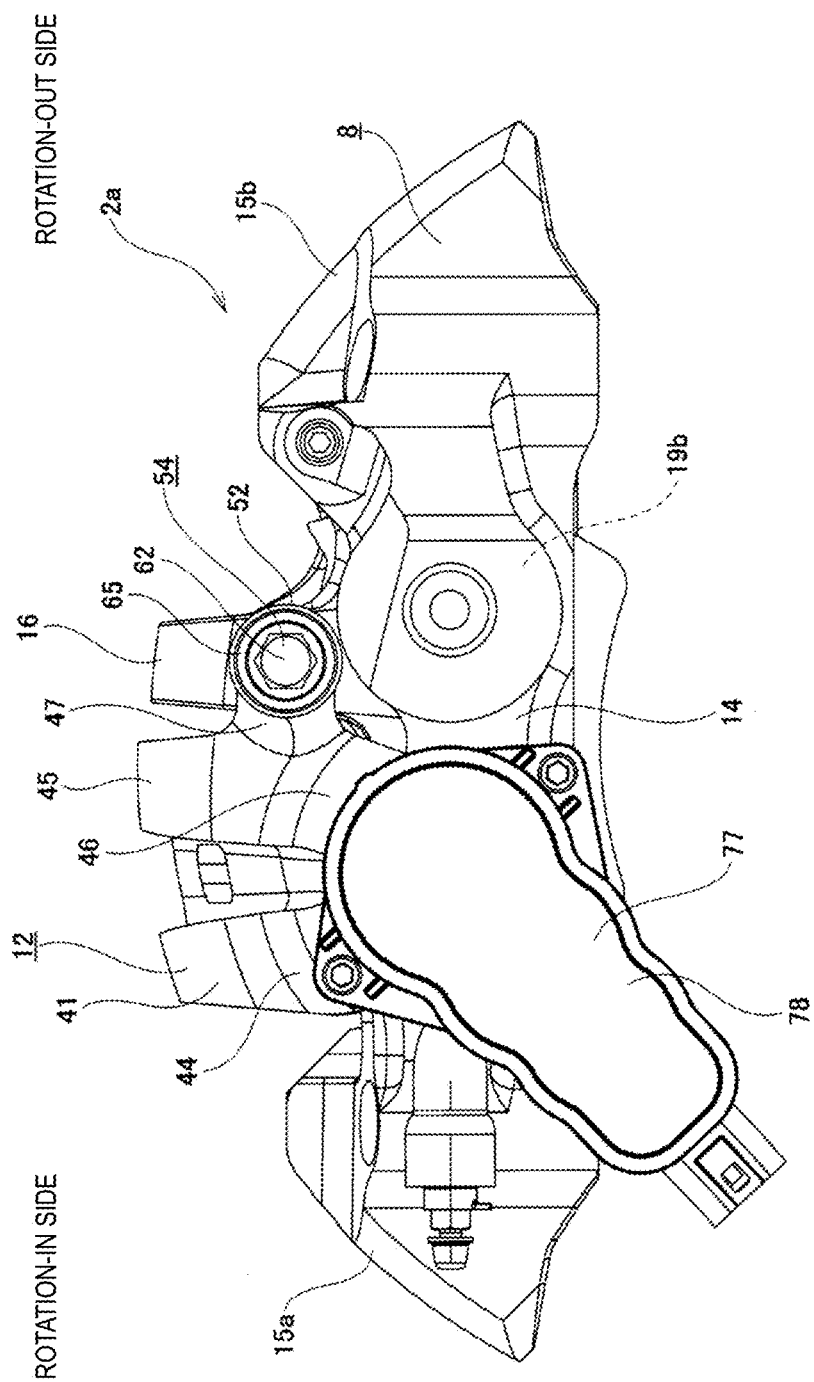
FIG. 2 is a back view illustrating the disc brake device according to the first embodiment.
Figure 3:
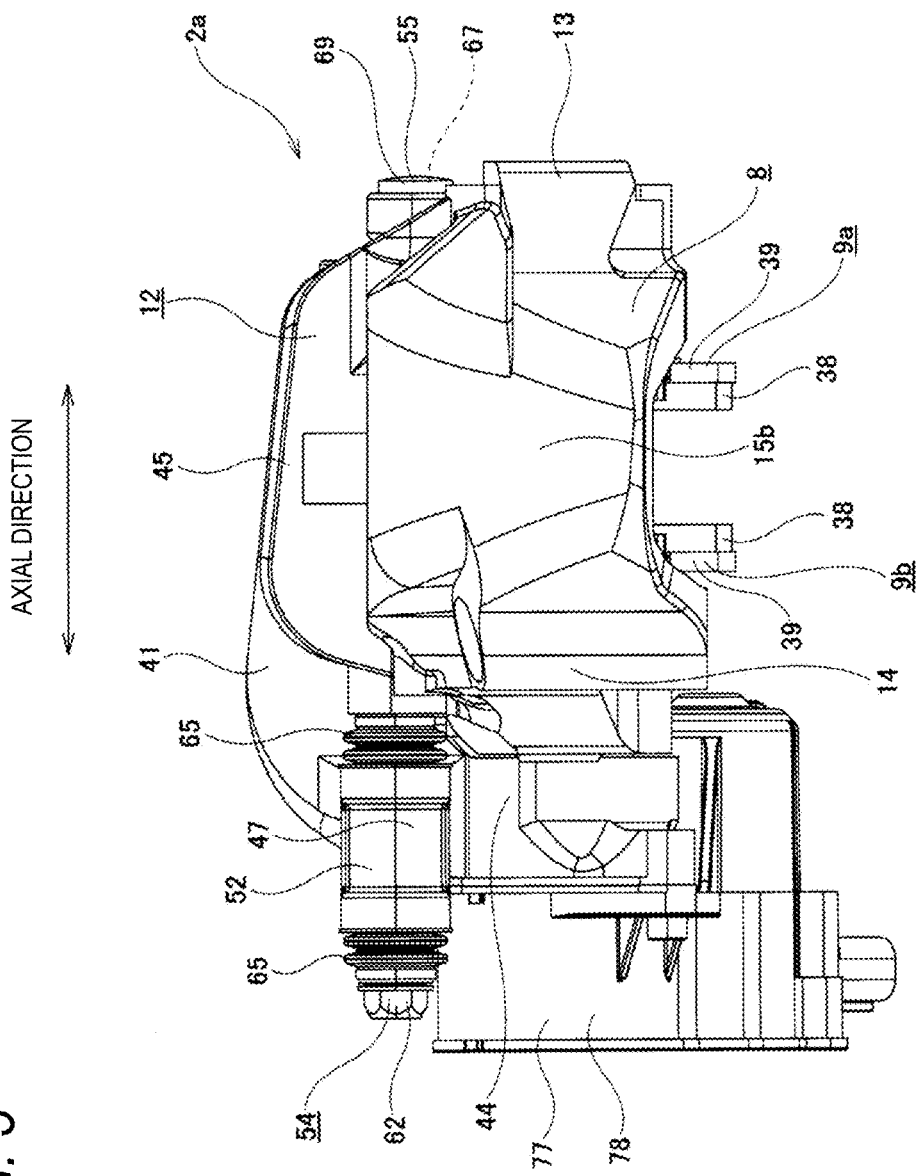
FIG. 3 is a left side view illustrating the disc brake device according to the first embodiment.
Figure 4:
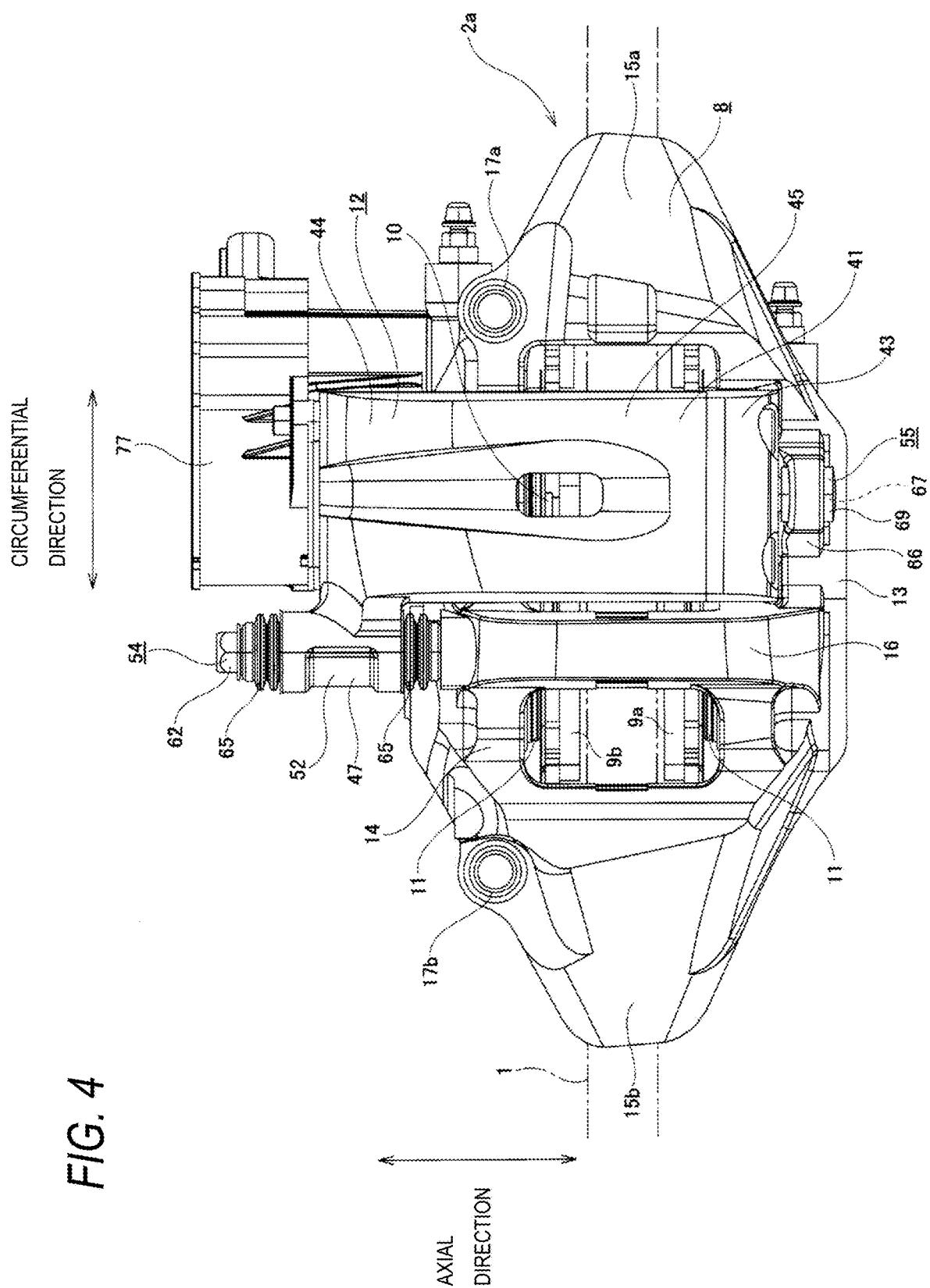
FIG. 4 is a plan view illustrating the disc brake device according to the first embodiment.
Figure 5:
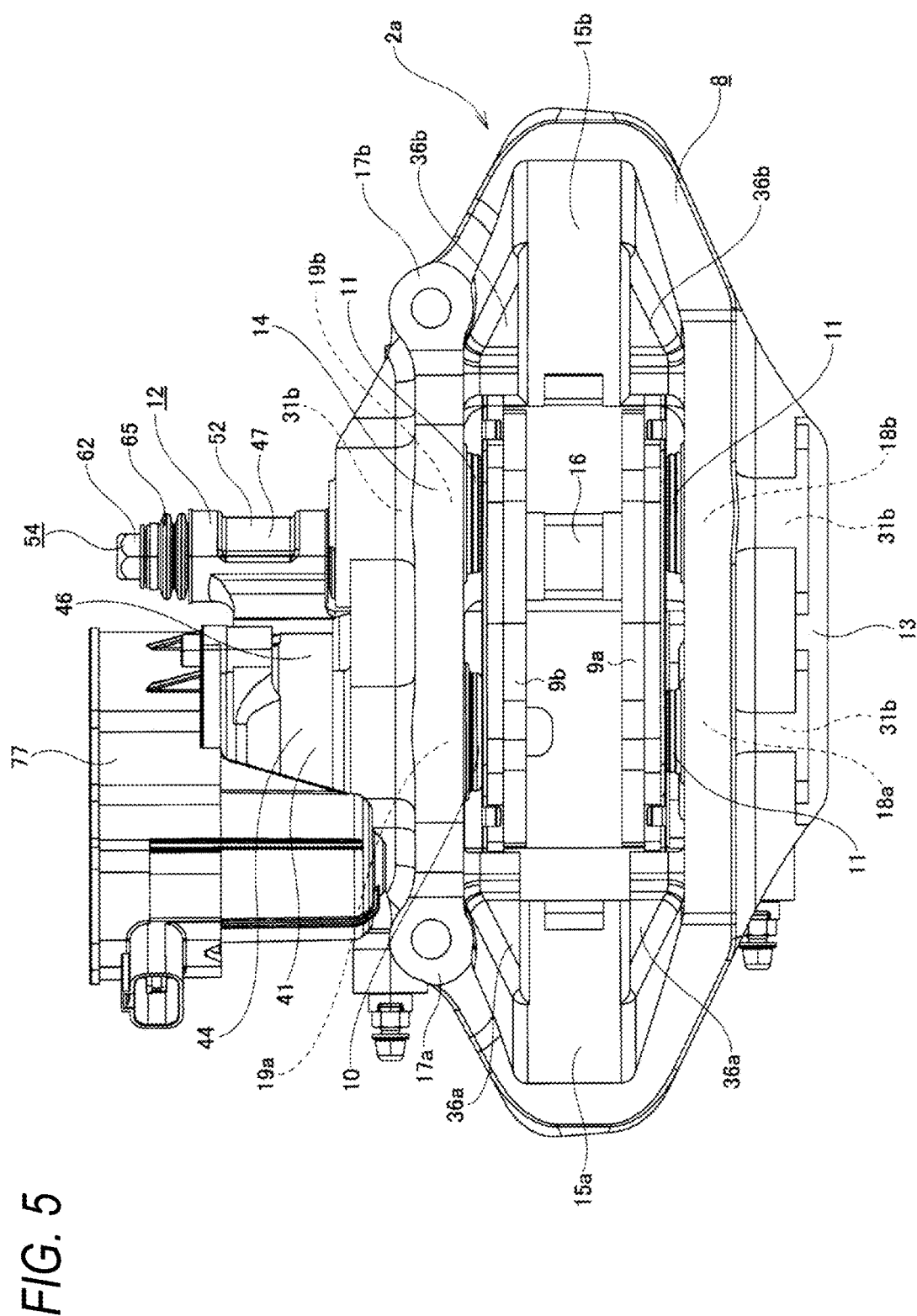
FIG. 5 is a bottom view illustrating the disc brake device according to the first embodiment.
Figure 6:
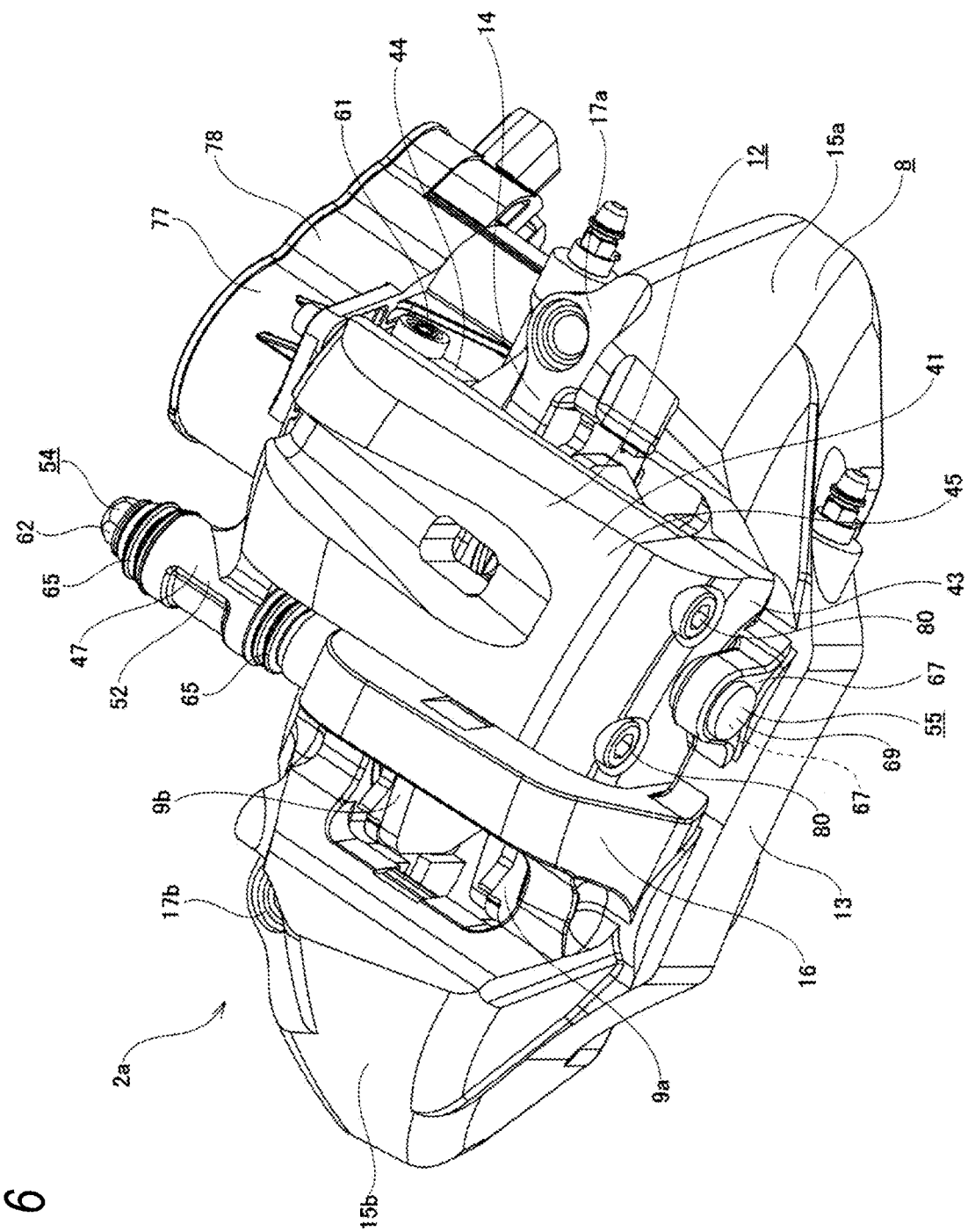
FIG. 6 is a perspective view of the disc brake device according to the first embodiment as viewed from a radial outer side and an axial outer side.
Figure 7:
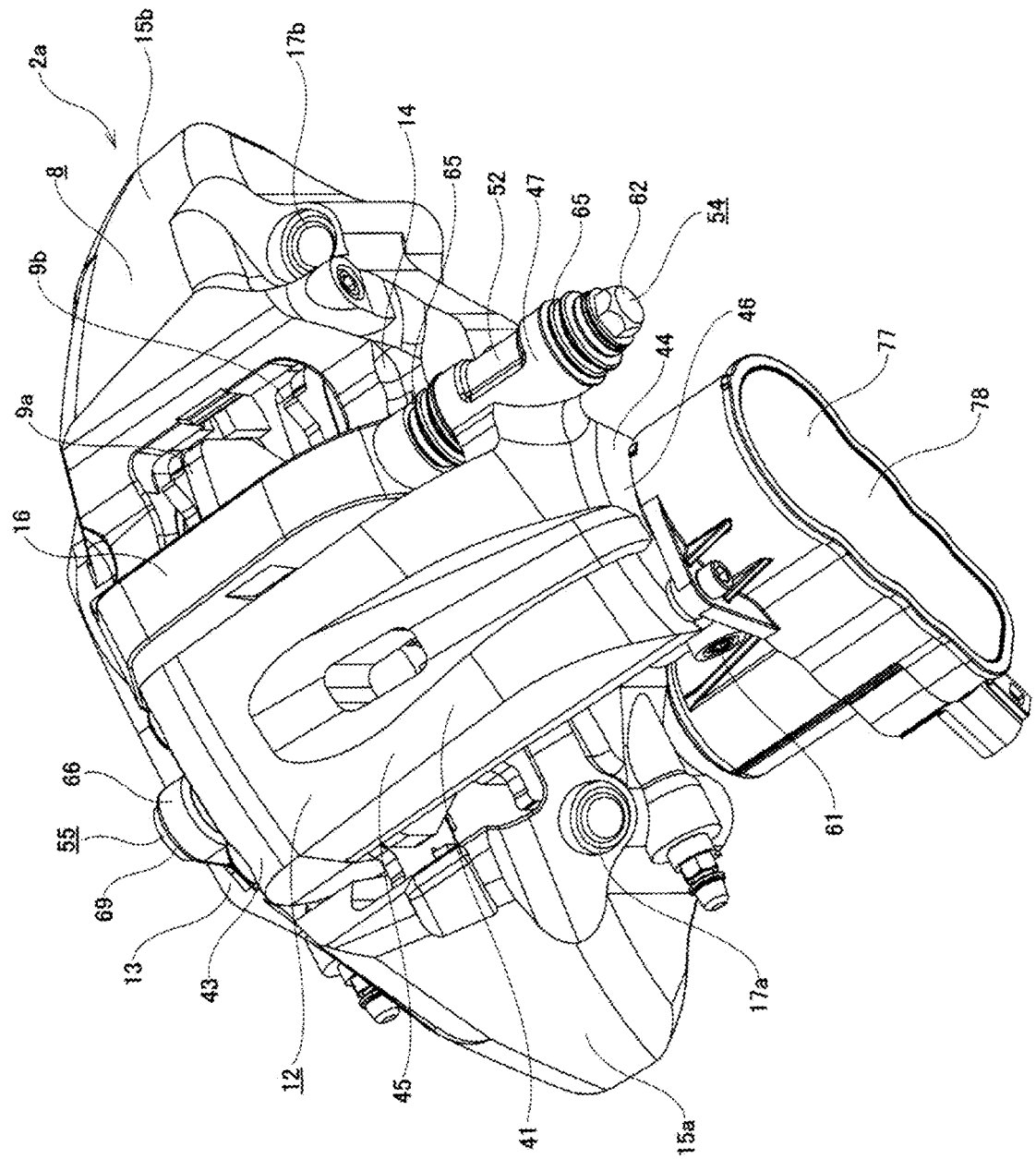
FIG. 7 is a perspective view of the disc brake device according to the first embodiment as viewed from the radial outer side and an axial inner side.

The caliper 8 supports the outer pad 9a and the inner pad 9b to be movable in an axial direction (a front-back direction in FIGS. 1 and 2, a left-right direction in FIG. 3, and an upper-lower direction in FIGS. 4 and 5). The caliper 8 is a cast product (including a die cast product) of a light alloy such as an aluminum alloy and includes an outer body 13 and an inner body 14 disposed on two sides of the rotor 1 in the axial direction (see FIG. 4), and a pair of coupling portions 15a and 15b and an intermediate coupling portion 16 disposed on a radial outer side of the rotor 1. The caliper 8 is supported and fixed to a mounting portion constituting the knuckle 4 (see FIG. 18) by a pair of mounting seats 17a and 17b provided in the inner body 14.

The coupling portion 15a is disposed on one circumferential side of the caliper 8 (right sides in FIGS. 1 and 4, left sides in FIGS. 2 and 5, and a rotation-in side during traveling of a vehicle) as well as the radial outer side of the rotor 1, and connects one circumferential side portion of the outer body 13 and one circumferential side portion of the inner body 14 in the axial direction. The coupling portion 15b is disposed on another circumferential side of the caliper 8 (left sides in FIGS. 1 and 4, right sides in FIGS. 2 and 5, and a rotation-out side during traveling of a vehicle) as well as the radial outer side of the rotor 1, and connects another circumferential side portion of the outer body 13 and another circumferential side portion of the inner body 14 in the axial direction. The intermediate coupling portion 16 is disposed on a circumferential intermediate side of the caliper 8 as well as the radial outer side of the rotor 1, and connects an intermediate portion of the outer body 13 and an intermediate portion of the inner body 14 in the axial direction.

The outer body 13 is disposed on an axial outer side of the rotor 1 and includes a rotation-in outer cylinder 18a on one circumferential side and a rotation-out outer cylinder 18b on another circumferential side. The inner body 14 is disposed on an axial inner side of the rotor 1 and includes a rotation-in inner cylinder 19a on one circumferential side and a rotation-out inner cylinder 19b on another circumferential side. The rotation-in outer cylinder 18a and the rotation-in inner cylinder 19a face each other in the axial direction and the rotation-out outer cylinder 18b and the rotation-out inner cylinder 19b face each other in the axial direction.

Among the four cylinders 18a, 18b, 19a, and 19b, the dual-purpose piston 10 used for both the service brake and the parking brake is fitted to an inner side of the rotation-in inner cylinder 19a so as to be displaceable in the axial direction. On inner sides of the remaining three cylinders 18a, 18b, and 19b other than the rotation-in inner cylinder 19a, the service-dedicated pistons 11 used only for the service brake are fitted so as to be displaceable in the axial direction.

Figure 8:
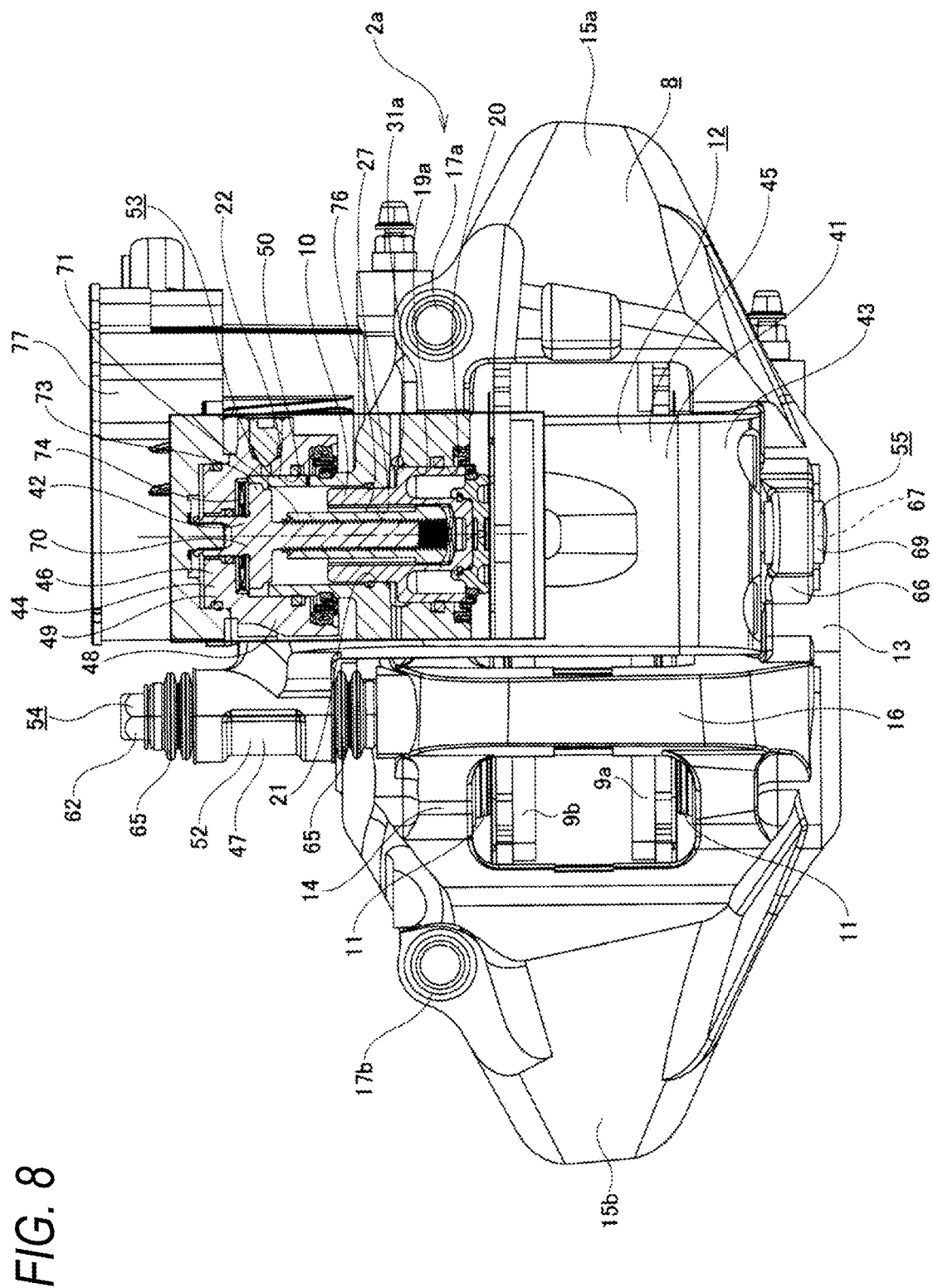
FIG. 8 is a cross-sectional view of a part of FIG. 4 obtained by cutting a peripheral portion of a first guide portion with a virtual plane that contains a central axis of a guide cylinder.
Figure 9:
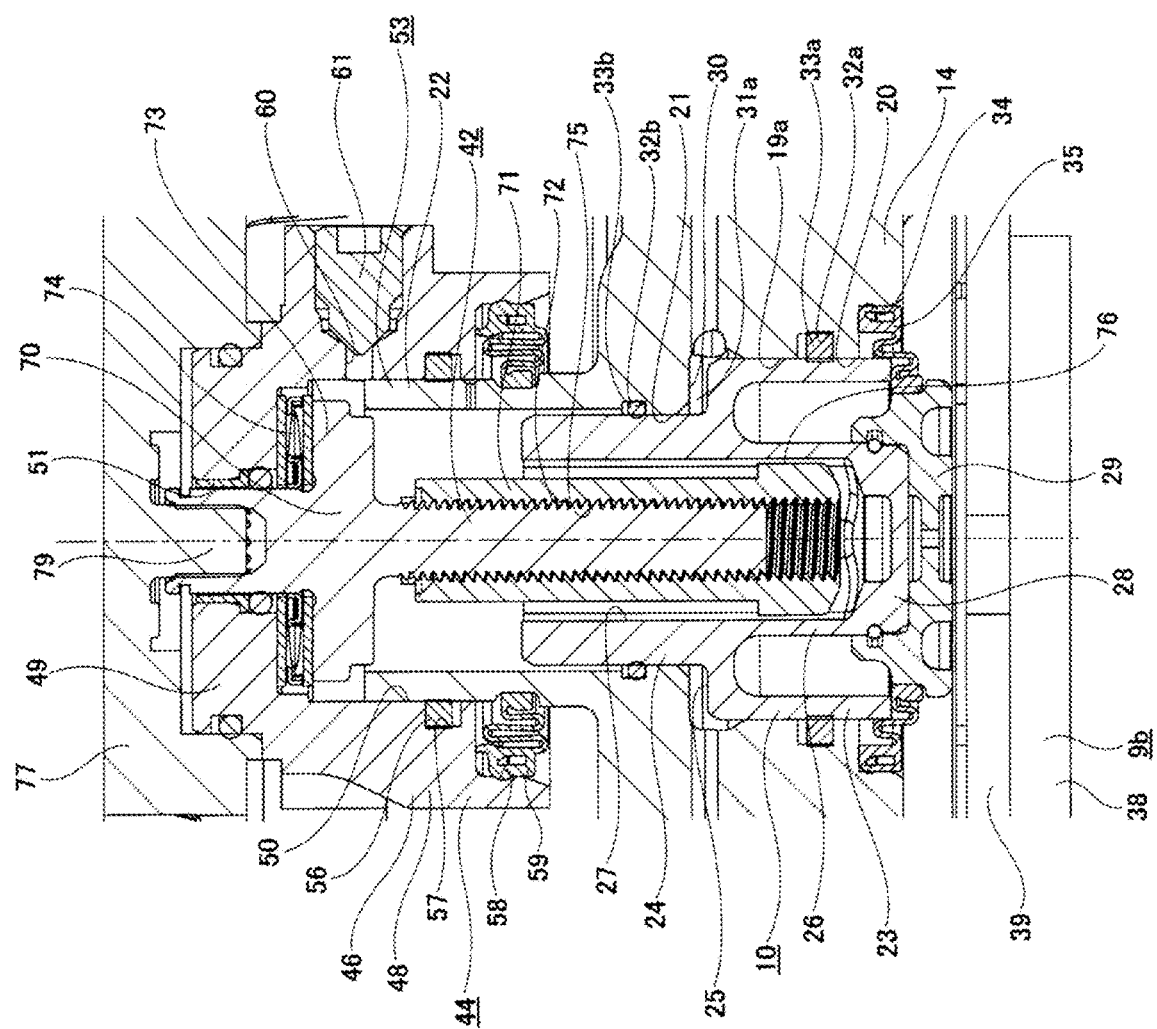
FIG. 9 is an enlarged cross-sectional view of the peripheral portion of the first guide portion.

As illustrated in FIGS. 8 and 9, the rotation-in inner cylinder 19a is not only open to an axial outer side surface of the inner body 14, but also to an axial inner side surface of the inner body 14. That is, the rotation-in inner cylinder 19a penetrates the inner body 14 in the axial direction. The rotation-in inner cylinder 19a is a stepped hole including a large diameter hole 20 at an axial outer half portion and a small diameter hole 21 at an axial inner half portion.

The small diameter hole 21 is provided with a guide cylinder 22 at an opening edge portion on an axial inner side. The guide cylinder 22 extends axially inward from the opening edge portion of the small diameter hole 21 of the rotation-in inner cylinder 19a, and is coaxial with the rotation-in inner cylinder 19a on an axial inner side of the inner body 14. The guide cylinder 22 has a cylindrical shape and the same inner diameter as the small diameter hole 21. A length of the guide cylinder 22 in the axial direction is larger than an amount of displacement of a clamp member 41 constituting the parking mechanism portion 12 which is displaced in the axial direction during the parking brake.

The dual-purpose piston 10 fitted to the rotation-in inner cylinder 19a is formed of, for example, an aluminum alloy and has a substantially cylindrical shape. The dual-purpose piston 10 has a stepped shape on its outer peripheral surface and includes a large diameter tubular portion 23 at an axial outer half portion and a small diameter tubular portion 24 at an axial inner half portion. Outer peripheral surfaces of the large diameter tubular portion 23 and the small diameter tubular portion 24 are connected by an annular stepped surface 25. The large diameter tubular portion 23 is provided with an extension tubular portion 26 on a radial inner side that extends axially from an axial outer side portion of the small diameter tubular portion 24. Inner peripheral surfaces of the small diameter tubular portion 24 and the extension tubular portion 26 are continuous in the axial direction with a constant inner diameter, and are formed with a female spline 27 thereon. An axial outer side portion of the extension tubular portion 26 is closed by a bottom 28. A substantially disc-shaped pressing portion 29 constituting a top end portion of the dual-purpose piston 10 is fitted to the bottom 28 of the extension tubular portion 26 from outside.

In the dual-purpose piston 10, the large diameter tubular portion 23 is fitted to an inner side of the large diameter hole 20 of the rotation-in inner cylinder 19a, while the small diameter tubular portion 24 is fitted to an inner side of the small diameter hole 21 of the rotation-in inner cylinder 19a. The stepped surface 25 of the dual-purpose piston 10 faces a bottom surface 30 of the large diameter hole 20 of the rotation-in inner cylinder 19a. The stepped surface 25, the bottom surface 30, the large diameter hole 20, and an outer peripheral surface of the small diameter tubular portion 24 define an annular hydraulic pressure chamber 31a for introduction of pressure oil. Further, the large diameter hole 20 and the small diameter hole 21 are formed with seal grooves 32a and 32b having a rectangular cross section, respectively. Annular piston seals 33a and 33b are mounted in the seal grooves 32a and 32b, respectively. Further, the large diameter hole 20 of the rotation-in inner cylinder 19a is formed with an annular groove 34 in an opening edge portion. A radial outer side portion of a dust cover 35 is mounted in an inner side of the annular groove 34, while a radial inner side portion of the dust cover 35 is mounted on an outer peripheral surface of the pressing portion 29. Accordingly, the dust cover 35 bridges the opening edge portion of the large diameter hole 20 and the top end portion of the dual-purpose piston 10.

The service-dedicated pistons 11 are formed of, for example, an aluminum alloy and have a bottomed cylindrical shape. Bottom surfaces of the service-dedicated pistons 11 and back portions of the cylinders 18a, 18b, and 19b to which the service-dedicated pistons 11 are fitted define a hydraulic pressure chamber 31b for introduction of pressure oil. Inner peripheral surfaces of the cylinders 18a, 18b, and 19b are formed with a seal groove (not illustrated) on which a piston seal (not illustrated) is attached. Opening edge portions of the cylinders 18a, 18b, and 19b and top end portions of the service-dedicated pistons 11 are bridged by a dust cover (not illustrated).

Pressure oil is fed to hydraulic chambers 31a and 31b of the cylinders 18a, 18b, 19a, and 19b respectively from an inlet provided in the inner body 14. In this embodiment, an area (pressure receiving area) of the annular stepped surface 25 constituting the dual-purpose piston 10 is equal to an area (pressure receiving area) of a bottom surface of the service-dedicated piston 11. Therefore, during the service brake, both the dual-purpose piston 10 and the service-dedicated piston 11 (and the other service-dedicated pistons 11) that faces the dual-purpose piston 10 in the axial direction press two axial side surfaces of the rotor 1 with an equal force.

A pair of guide wall portions 36a and 36b protruding axially to approach the rotor 1 are provided on two circumferential side portions of an axial inner side surface of the outer body 13 as well as on two circumferential side portions of an axial outer side surface of the inner body 14. The guide wall portions 36a and 36b are provided with guide grooves 37a and 37b on respective side surfaces facing each other in the circumferential direction; the guide grooves 37a and 37b extend in a direction substantially orthogonal to the side surfaces. The outer pad 9a and the inner pad 9b are disposed on two sides of the rotor 1 in the axial direction. Specifically, the outer pad 9a is disposed between the rotor 1 and the outer body 13, while the inner pad 9b is disposed between the rotor 1 and the inner body 14.

The outer pad 9a and the inner pad 9b each include a lining (friction material) 38 and a metal back plate (pressure plate) 39 that supports a back surface of the lining 38. The back plate 39 includes an ear 40 protruding in the circumferential direction on two circumferential side portions thereof. A pair of ears 40 provided on the outer pad 9a is loosely engaged with a pair of guide grooves 37a and 37b provided in the outer body 13, respectively. A pair of ears 40 provided on the inner pad 9b is loosely engaged with a pair of guide grooves 37a and 37b provided in the inner body 14, respectively. Accordingly, the outer pad 9a and the inner pad 9b are supported to be displaceable in the axial direction relative to the caliper 8 and not displaceable in the circumferential direction or the radial direction.

Figure 16:
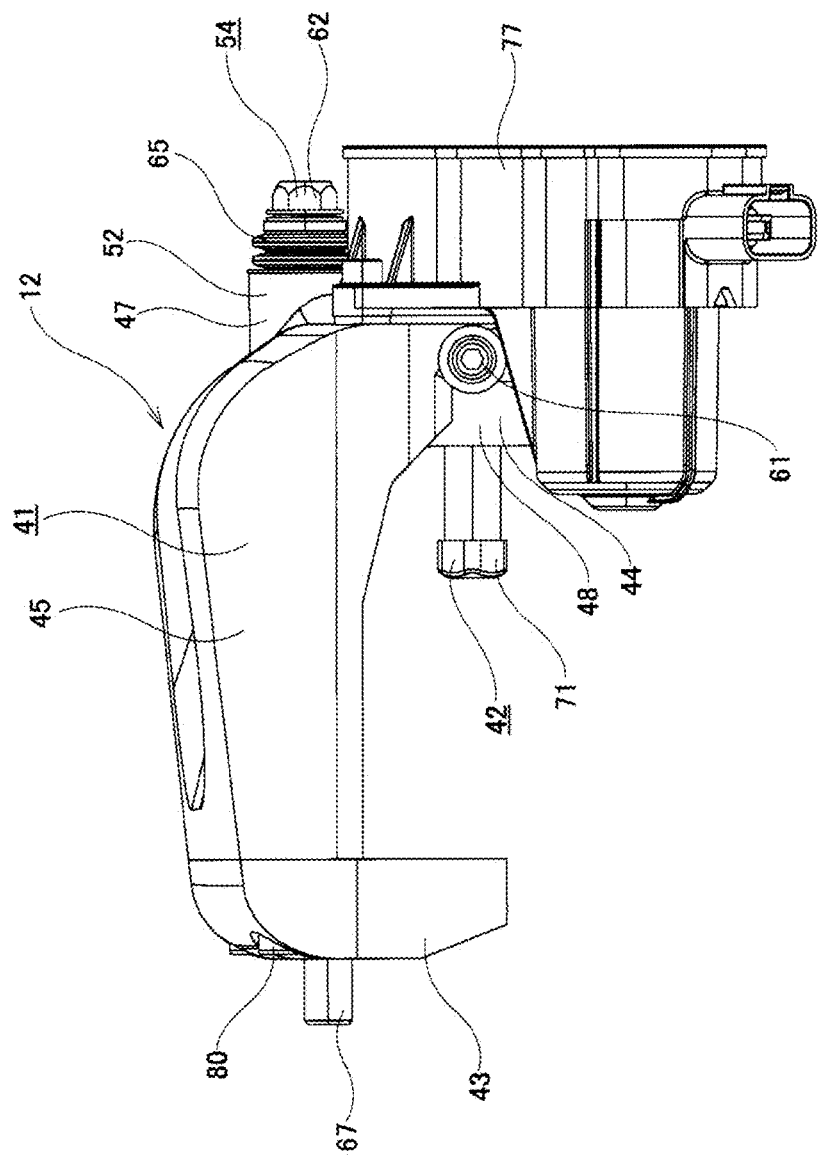
FIG. 16 is a side view as viewed from one circumferential side, in which the parking mechanism portion is detached from the disc brake device according to the first embodiment.
Figure 17:
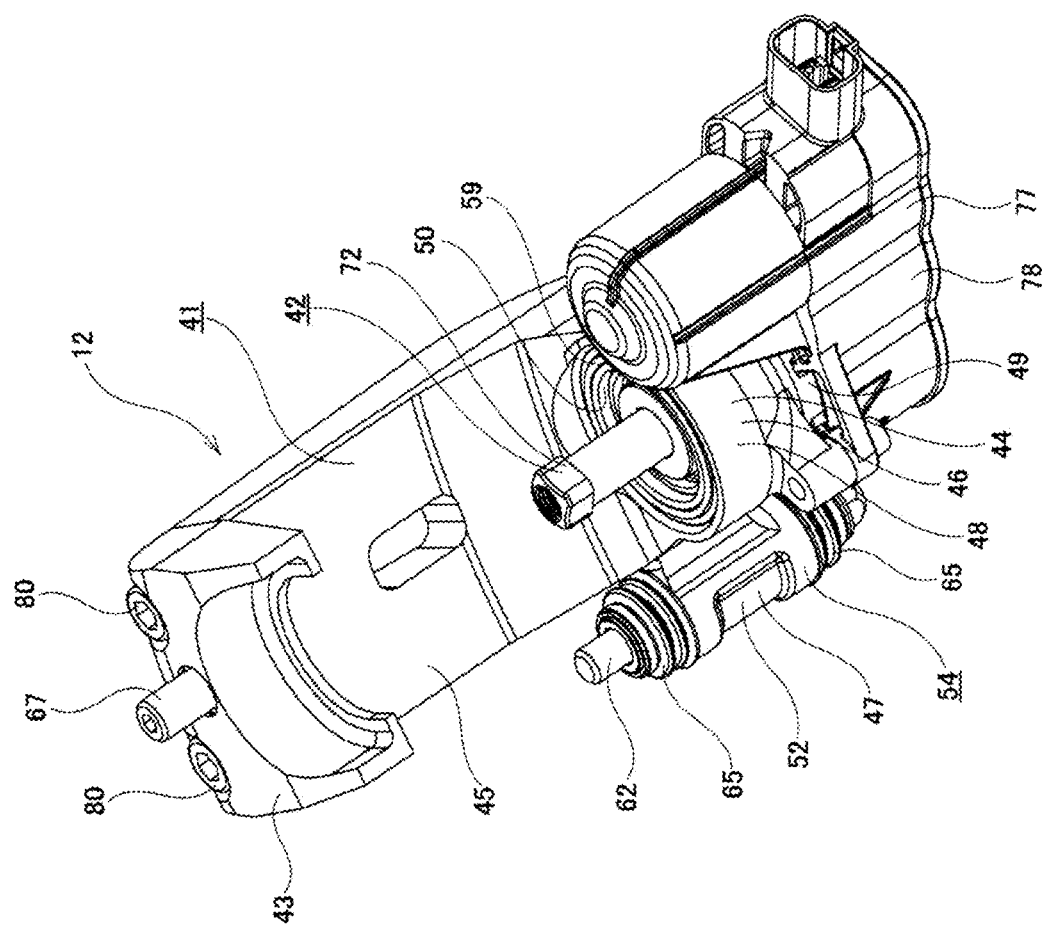
FIG. 17 is a perspective view as viewed from the radial inner side and the axial outer side, in which the parking mechanism portion is detached from the disc brake device according to the first embodiment.

As illustrated in FIGS. 16 and 17, the parking mechanism portion 12 includes the clamp member 41 and a thrust generating mechanism 42. The clamp member 41, which is formed of an aluminum-based alloy or an iron-based alloy and has an inverted U-shape, is disposed between the coupling portion 15a and the intermediate coupling portion 16 on one circumferential side and crosses the pair of pads 9a and 9b and the inner body 14 from radially outside. That is, the clamp member 41 is mounted on the caliper 8. The clamp member 41 includes a bifurcated pressing portion 43 on an axial outer side and a clamp base portion 44 on an axial inner side. The clamp member 41 includes a bridge portion 45 that is disposed on a radial outer side of the rotor 1 and axially couples the pressing portion 43 and the clamp base portion 44. In this embodiment, the pressing portion 43 and the bridge portion 45 are formed separately from each other and are coupled to each other by a pair of bolts 80 disposed in the axial direction. Specifically, a top end portion of the bolt 80 axially inserted into the pressing portion 43 is screwed to an axial outer end portion of the bridge portion 45. In contrast, the bridge portion 45 and the clamp base portion 44 are integral with each other.

The pressing portion 43 is inserted between an axial inner side surface of one circumferential half portion of the outer body 13 and an axial outer side surface of one circumferential half portion of the outer pad 9a from radially outside, so as to cross an axial inner side portion of the rotation-in outer cylinder 18a. Therefore, a pair of concave portions to insert a bifurcated radial inner portion of the pressing portion 43 is provided on two circumferential sides of an axial inner side portion of the rotation-in outer cylinder 18a of the outer body 13.

The clamp base portion 44 is disposed on an axial inner side of the inner body 14 and includes a base main body 46 and an arm 47 protruding radially toward another circumferential side from the base main body 46. As illustrated in FIGS. 8 and 9, the base main body 46 has a bottomed cylindrical shape having a housing hole 50 opened axially outward, and includes a tubular portion 48 and a bottom plate 49 that closes an axial inner side opening of the tubular portion 48. The bottom plate 49 is provided with a through hole 51 in the axial direction in a central portion thereof. The housing hole 50 has an inner diameter slightly larger than an outer diameter of the guide cylinder 22 provided on the axial inner side of the inner body 14.

A top end portion of the arm 47 is formed by a cylindrical portion 52 extending in the axial direction. The cylindrical portion 52 is open on two axial sides and a central axis thereof is parallel to a central axis of the housing hole 50 provided in the base main body 46. The cylindrical portion 52 has substantially the same axial dimension as the base main body 46 and an inner diameter smaller than that of the housing hole 50.

In this embodiment, the clamp member 41 is supported to be displaceable in the axial direction relative to the caliper 8 via a first guide portion 53, a second guide portion 54, and a third guide portion 55 and not displaceable in the circumferential direction or the radial direction.

As illustrated in FIGS. 8 and 9, the first guide portion 53 includes the guide cylinder 22 provided on the axial inner side of the inner body 14 and the housing hole 50 opened to an axial outer side surface of the clamp base portion 44. That is, the first guide portion 53 is formed by fitting a front half portion of the guide cylinder 22 to an inner side of the housing hole 50 so as to enable relative displacement in the axial direction. A central axis of the guide cylinder 22 is coaxial with the central axis of the housing hole 50. A radial gap between an outer peripheral surface of the guide cylinder 22 and an inner peripheral surface of the housing hole 50 is set to such a size that no twist occurs during the parking brake even when the pressing portion 43 and the clamp base portion 44 are displaced to be separated from each other.

A rectangular elastic ring 56 is interposed between the outer peripheral surface of the guide cylinder 22 and the inner peripheral surface of the housing hole 50. Therefore, a seal groove 57 is formed in the inner peripheral surface of the housing hole 50; the elastic ring 56 is mounted in the seal groove 57. In this embodiment, since the elastic ring 56 is interposed between the outer peripheral surface of the guide cylinder 22 and the inner peripheral surface of the housing hole 50, airtightness between the outer peripheral surface of the guide cylinder 22 and the inner peripheral surface of the housing hole 50 can be ensured. Therefore, foreign matters such as water can be effectively prevented from entering an inside of the guide cylinder 22. Further, it is possible to center the guide cylinder 22 and the housing hole 50 since the guide cylinder 22 is elastically supported by the elastic ring 56, so that twists can be effectively prevented. Therefore, the radial gap between the outer peripheral surface of the guide cylinder 22 and the inner peripheral surface of the housing hole 50 can be ensured relatively large. Although a rectangular seal having a rectangular cross section is used as the elastic ring 56 in this embodiment, it is also possible to use an O-ring having a circular cross section.

The housing hole 50 is formed with an annular groove 58 in an opening edge portion. A radial outer side portion of a dust cover 59 is mounted in an inner side of the annular groove 58, and a radial inner side portion of the dust cover 59 is mounted on an axial intermediate portion of the outer peripheral surface of the guide cylinder 22. Accordingly, the dust cover 59 is bridged between the opening edge portion of the housing hole 50 and the intermediate portion of the guide cylinder 22, so as to prevent foreign matters such as water from entering between the outer peripheral surface of the guide cylinder 22 and the inner peripheral surface of the housing hole 50.

In this embodiment, in order to prevent pressure in the housing hole 50 and the guide cylinder 22 from increasing when the front half portion of the guide cylinder 22 is fitted (inserted) to the inner side of the housing hole 50, air in the housing hole 50 and the guide cylinder 22 is allowed to escape outside through a through hole 60 connecting the housing hole 50 and an outer peripheral surface of the tubular portion 48 formed on a circumferential portion thereof. After the front half portion of the guide cylinder 22 is fitted into the housing hole 50, an opening of the through hole 60 opened to the outer peripheral surface of the tubular portion 48 is closed by a stopper 61.

Figure 10:
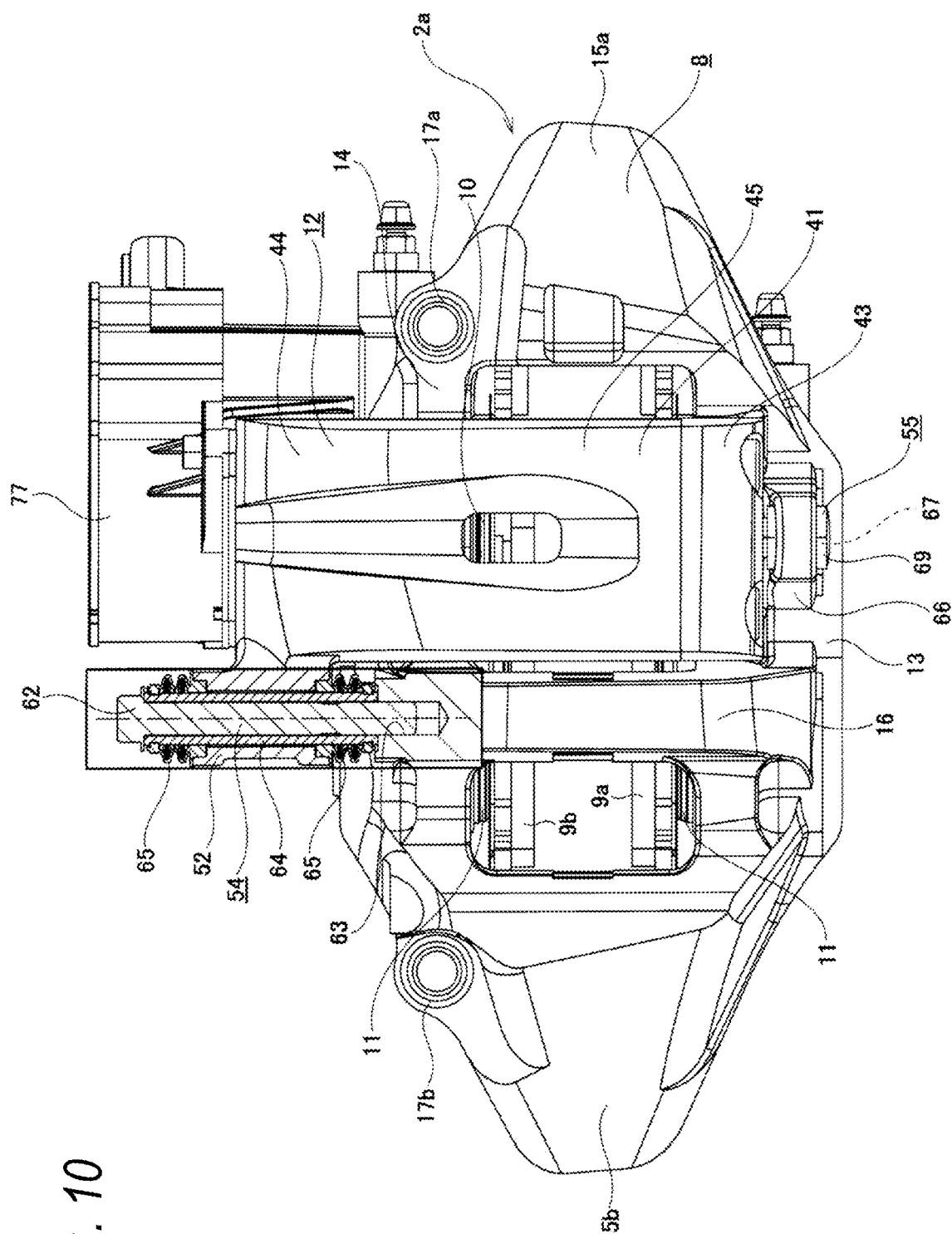
FIG. 10 is a cross-sectional view of a part of FIG. 4 obtained by cutting a peripheral portion of a second portion with a virtual plane that contains a central axis of an inner guide pin.

The second guide portion 54 is disposed at the same position as the intermediate coupling portion 16 in the circumferential direction, which is deviated from the first guide portion 53 in the circumferential direction, and supports the clamp member 41 to be axially displaceable relative to the caliper 8 together with the first guide portion 53. As illustrated in FIG. 10, the second guide portion 54 includes the cylindrical portion 52 provided on the arm 47 constituting the clamp base portion 44 and an inner guide pin 62 fixed to the inner body 14. An axial outer side portion of the inner guide pin 62 is fixed to the inner body 14, and an axial intermediate portion is inserted into the cylindrical portion 52 to be slidable (relative displacement) in the axial direction. Therefore, the inner guide pin 62 is disposed (bridged) between the inner body 14 and the clamp base portion 44 (the cylindrical portion 52) in the axial direction. The axial outer side portion of the inner guide pin 62 is screwed into a female screw hole 63 at the same position as the intermediate coupling portion 16 in the circumferential direction on the axial inner side surface of the inner body 14. The female screw hole 63 is opened to a part located on a radial outer side of the rotation-out inner cylinder 19b. A central axis of the inner guide pin 62 is parallel to the central axis of the guide cylinder 22.

As described above, the inner guide pin 62 is disposed at the same position as the intermediate coupling portion 16 in the circumferential direction. For this reason, the inner guide pin 62 is fixed to a part of the caliper 8 that has a high rigidity in the axial direction, that is, a part having a small amount of displacement. Therefore, the inner guide pin 62 can be prevented from tilting due to deformation of the caliper 8. Further, it is not necessary to increase a thickness of the female screw hole 63 for a purpose of ensuring a depth dimension thereof since the depth dimension can be sufficiently ensured as in a case where the female screw hole 63 is formed in a position deviated from the intermediate coupling portion 16 in the circumferential direction. For this reason, the caliper 8 can be prevented from increasing in weight. Further, a circumferential dimension of the clamp member 41 can be reduced since a protruding amount of the arm 47 in the circumferential direction is reduced. Therefore, the layout can be improved.

The axial intermediate portion of the inner guide pin 62 is inserted into the cylindrical portion 52 through a cylindrical sleeve 64 made of metal, for example. The sleeve 64 has an axial dimension larger than that of the cylindrical portion 52, and is interposed between the inner side surface of the inner body 14 and a head of the inner guide pin 62 while fixing the inner guide pin 62 to the inner body 14. That is, positioning of the inner guide pin 62 in the axial direction is achieved by restricting a screwing amount of the inner guide pin 62 by the sleeve 64. An inner diameter of the sleeve 64 is slightly larger than an outer diameter of the inner guide pin 62; an outer diameter of the sleeve 64 is slightly smaller than an inner diameter of the cylindrical portion 52. In this embodiment, since the inner guide pin 62 is inserted into the cylindrical portion 52 through the sleeve 64, sliding resistance can be reduced and a dimensional variation between the sleeve 64 and the inner guide pin 62 can be absorbed. Further, a dust cover 65 is bridged between two axial end portions of the cylindrical portion 52 and two axial end portions of the sleeve 64, respectively. Accordingly, foreign matters such as water can be prevented from entering between the inner peripheral surface of the cylindrical portion 52 and an outer peripheral surface of the sleeve 64.

Figure 11:
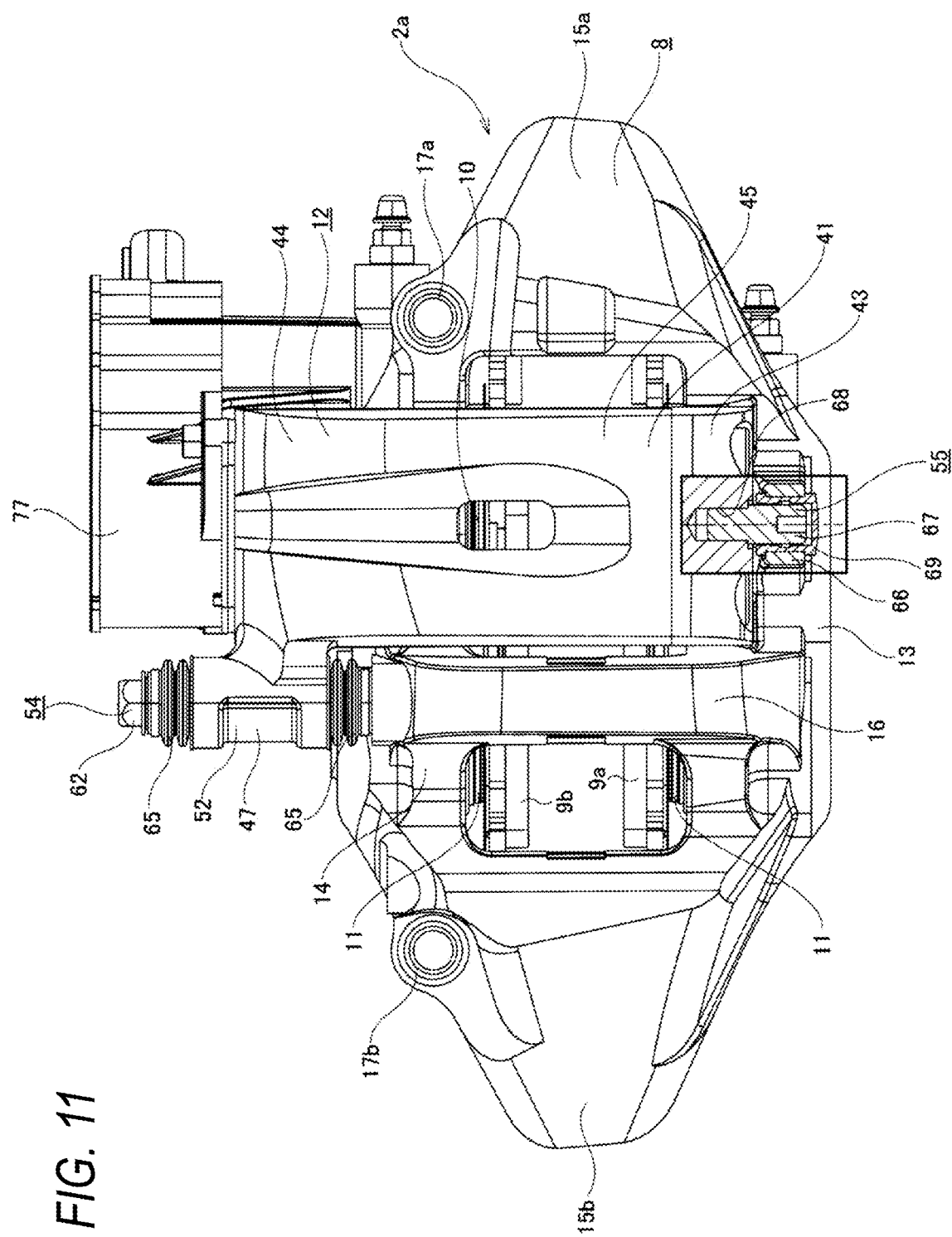
FIG. 11 is a cross-sectional view of a part of FIG. 4 obtained by cutting a peripheral portion of a third portion with a virtual plane that contains a central axis of an outer guide pin.
Figure 12:
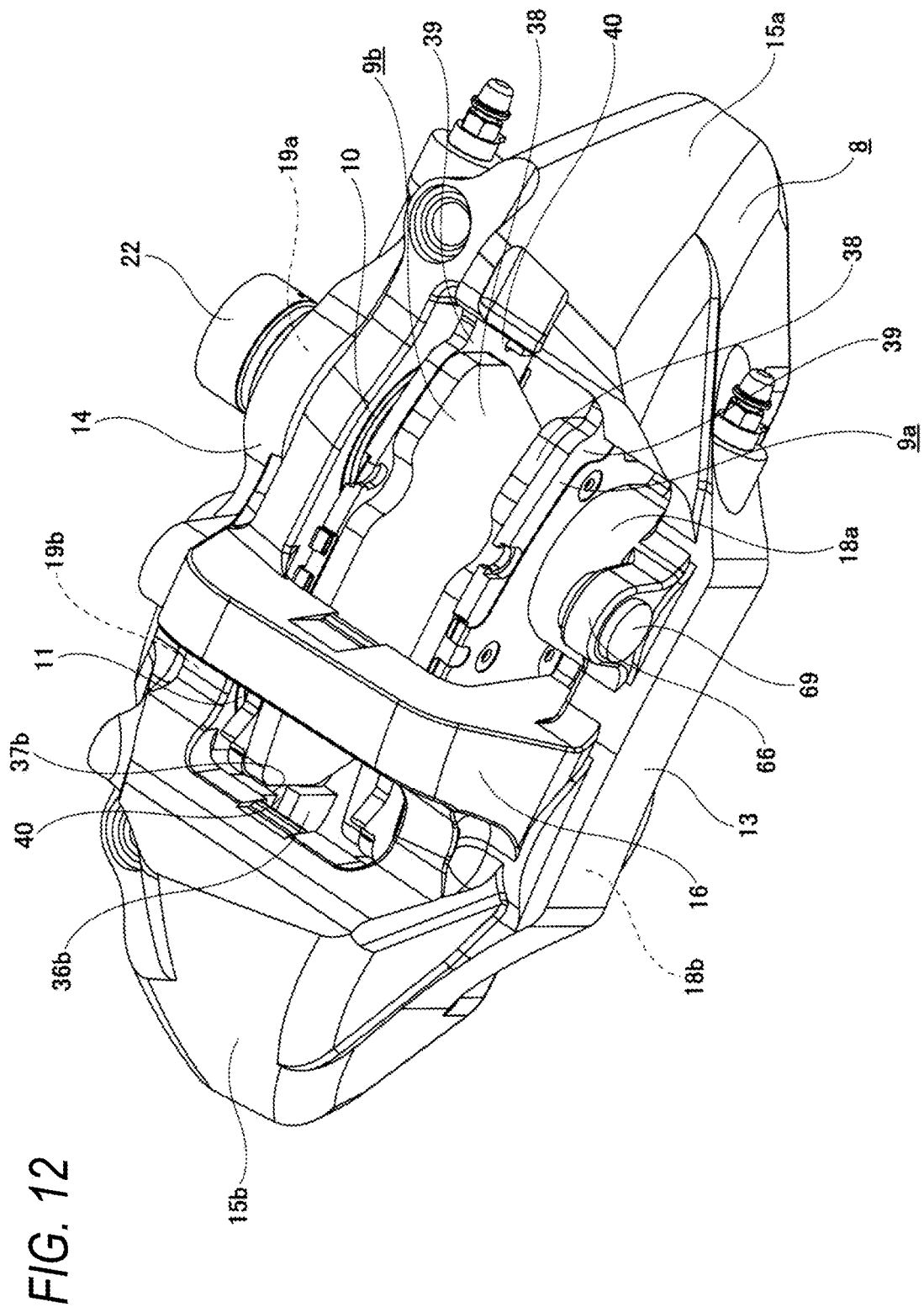
FIG. 12 is a view corresponding to FIG. 6, in which a parking mechanism portion is removed from the disc brake device according to the first embodiment.
Figure 13:
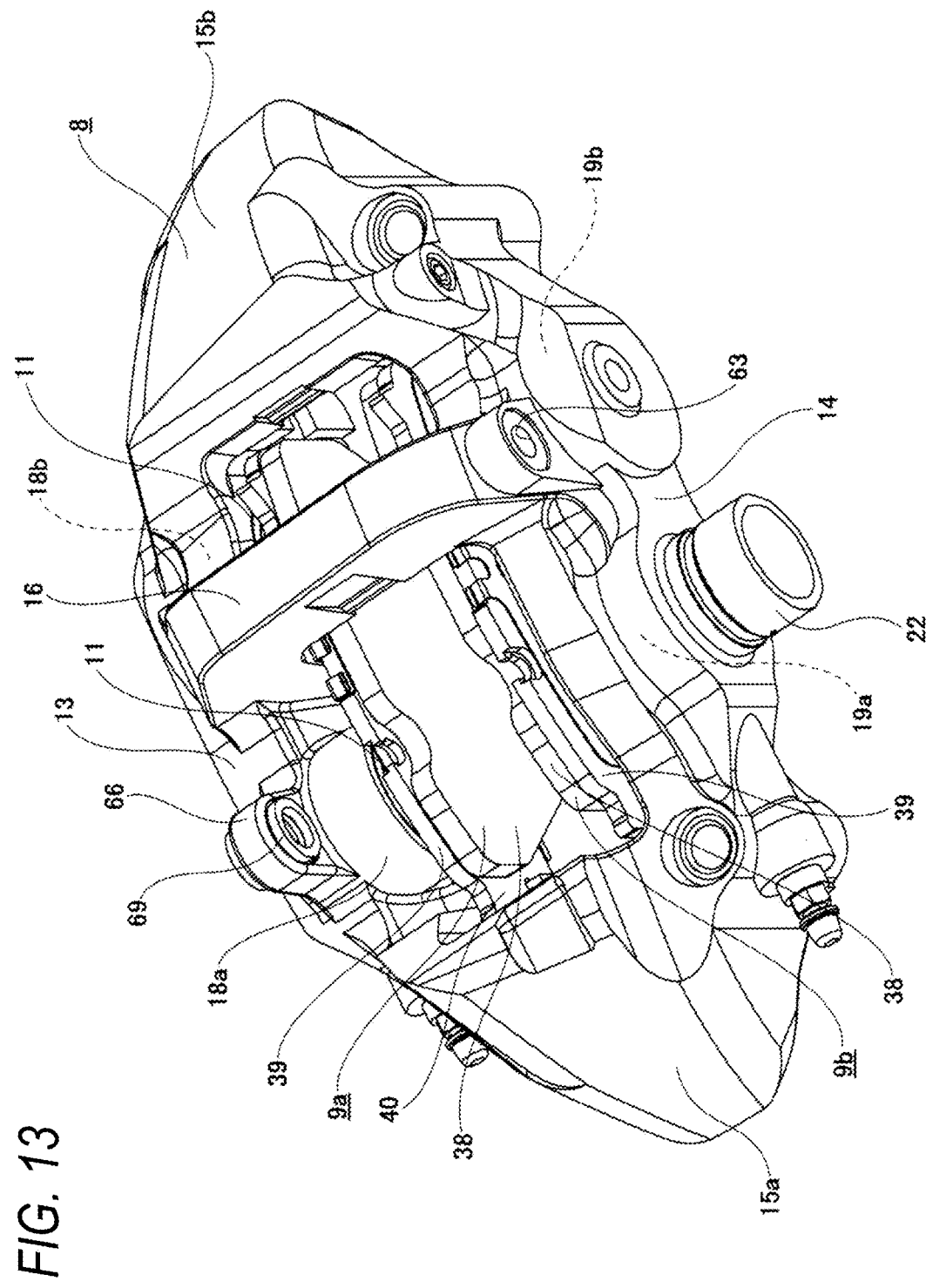
FIG. 13 is a view corresponding to FIG. 7, in which the parking mechanism portion is removed from the disc brake device according to the first embodiment.
Figure 14:
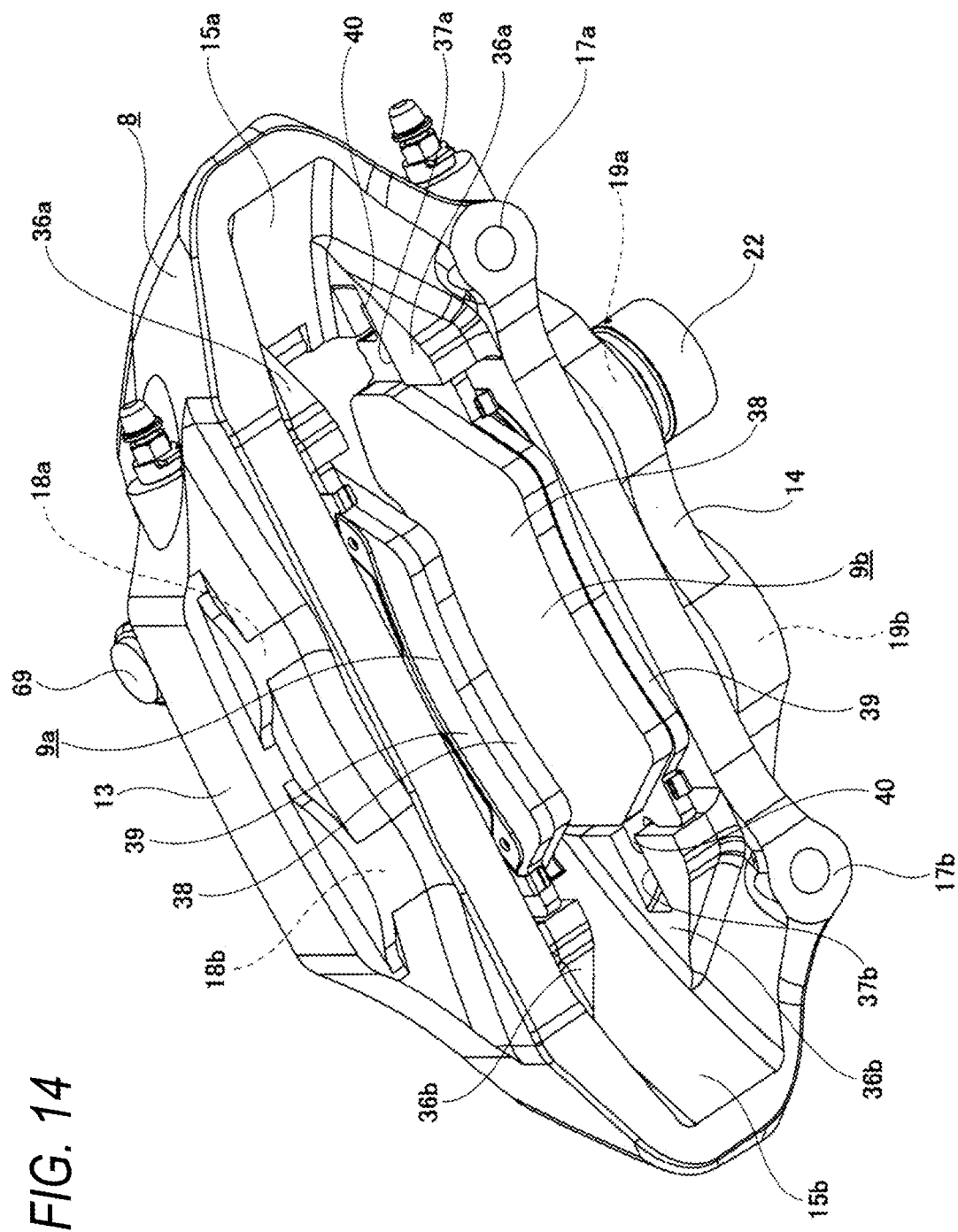
FIG. 14 is a perspective view as viewed from a radial inner side and the axial outer side, in which the parking mechanism portion is removed from the disc brake device according to the first embodiment.
Figure 15:
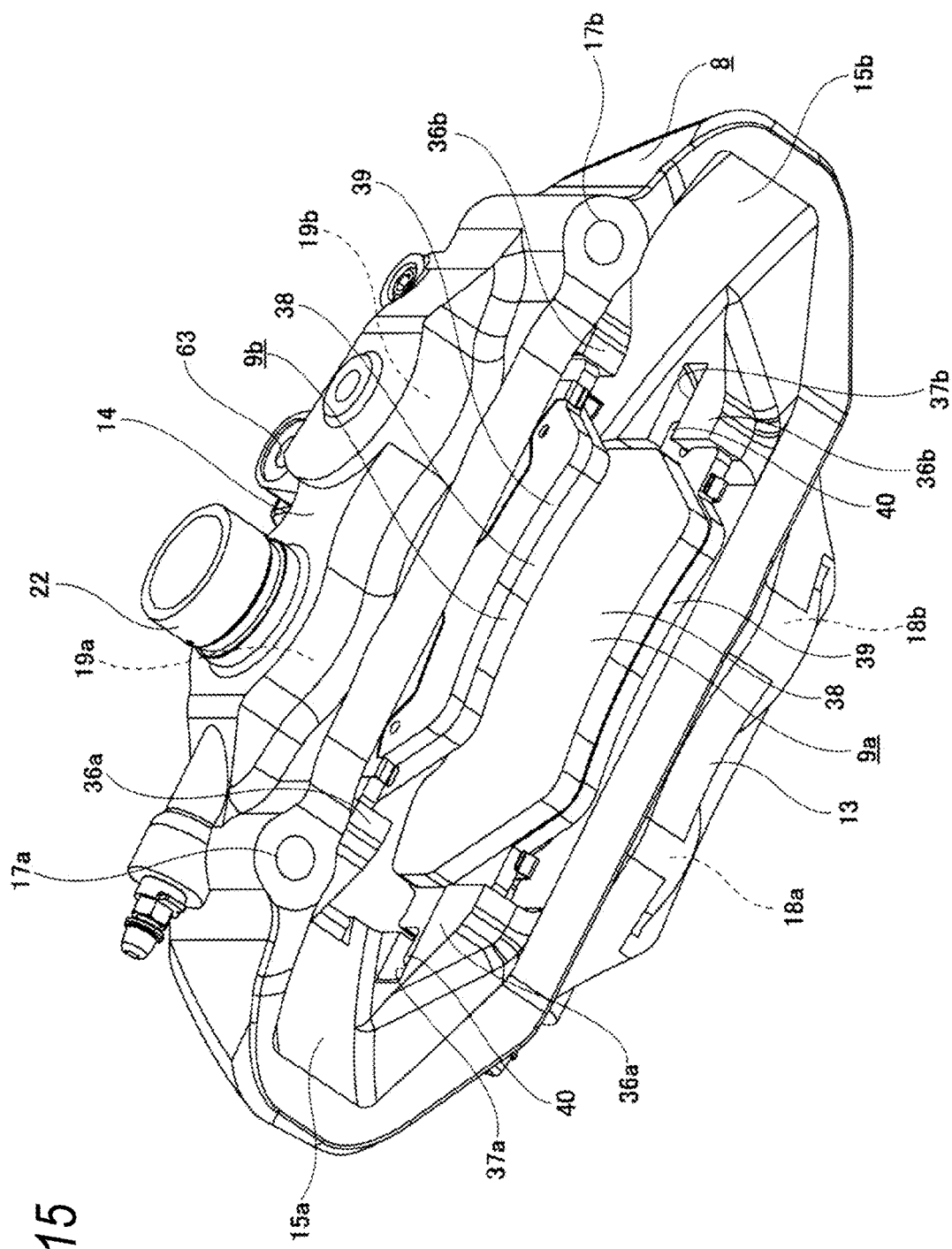
FIG. 15 is a perspective view as viewed from the radial inner side and the axial inner side, in which the parking mechanism portion is removed from the disc brake device according to the first embodiment.

The third guide portion 55 is disposed at the same position as the first guide portion 53 in the circumferential direction, and supports the clamp member 41 to be axially displaceable relative to the caliper 8 together with the first guide portion 53 and the second guide portion 54. As illustrated in FIG. 11, the third guide portion 55 includes a support tubular portion 66 provided in the outer body 13 and an outer guide pin 67 fixed to the clamp member 41. The support tubular portion 66 is provided on a radial outer side of the rotation-in outer cylinder 18a in the outer body 13. An axial inner side portion of the outer guide pin 67 is fixed to the pressing portion 43 of the clamp member 41; an axial outer side portion thereof is inserted into the support tubular portion 66 to be slidable (relative displacement) in the axial direction. Therefore, the outer guide pin 67 is disposed (bridged) between the outer body 13 and the pressing portion 43 in the axial direction. The axial inner side portion of the outer guide pin 67 is screwed into a female screw hole 68 opened to an axial outer side surface of the pressing portion 43. A central axis of the outer guide pin 67 is parallel to the central axis of the housing hole 50. The central axis of the outer guide pin 67 and the central axis of the housing hole 50 are in the same position in the circumferential direction and in different positions in the radial direction.

The axial outer side portion of the outer guide pin 67 is inserted into the support tubular portion 66 via a cylindrical elastic body (rubber bush) 69 made of an elastic material. The elastic body 69 is prevented from coming out of the support tubular portion 66 in the axial direction and covers an axial outer end surface of the outer guide pin 67 with its bottom. The elastic body 69 elastically supports the axial outer side portion of the outer guide pin 67 to the outer body 13.

As illustrated in FIGS. 8 and 9, the thrust generating mechanism 42 is a feed screw mechanism that converts a rotational motion into a linear motion and changes its total length in the axial direction during operation, and includes a spindle 70 that is an inner displacement member and a nut 71 that is an outer displacement member.

The spindle 70 has a male screw portion 72 on an outer peripheral surface from a top end portion (axial outer side portion) to an intermediate portion and a flange portion 73 having a larger diameter at a part close to an end portion. The base end portion (axial inner side portion) of the spindle 70 is rotatably supported inside the through hole 51 formed in the bottom plate 49 of the clamp base portion 44. The front end portion to the intermediate portion of the spindle 70 are inserted into the dual-purpose piston 10 fitted to the rotation-in inner cylinder 19a from axially inside. A central axis of the spindle 70 is coaxial with the central axis of the housing hole 50 (guide cylinder 22). A thrust bearing 74 is disposed between an axial inner side surface of the flange portion 73 and an axial outer side surface of the bottom plate 49. Accordingly, axial loads acting on the flange portion 73 can be supported by the bottom plate 49, and flange portion 73 can rotate relative to the bottom plate 49.

The nut 71 has a female screw portion 75 on an inner peripheral surface thereof and is screwed to the male screw portion 72 of the top end portion and the intermediate portion of the spindle 70. A front end portion (axial outer side portion) of the nut 71 has a diameter larger than those of other parts and is provided with a male spline 76 on an outer peripheral surface thereof. The male spline 76 is spline-engaged with the female spline 27 formed on the inner peripheral surface of the small diameter tubular portion 24 and the extension tubular portion 26 constituting the dual-purpose piston 10. Therefore, the nut 71 is disposed inside the dual-purpose piston 10 to be displaceable in the axial direction and incapable of relative rotation. A central axis of the nut 71 is also coaxial with the central axis of the housing hole 50 (guide cylinder 22).

In this embodiment, an electric drive device (MGU) 77 is supported and fixed to an axial inner side of the clamp base portion 44. The electric drive device 77 includes a casing 78 and a speed reduction mechanism such as an electric motor and a gear speed reducer housed respectively inside the casing 78. A rotary shaft 79 that fixes a final gear constituting the speed reduction mechanism is connected to the base end portion of the spindle 70 and is incapable of relative rotation. Accordingly, the nut 71 is displaced relative to the inner body 14 in the axial direction by rotating the spindle 70 based on energization of the electric motor.

During the service brake by the opposed-piston type disc brake device 2a, pressure oil is fed to the hydraulic chambers 31a and 31b of all the cylinders 18a, 18b, 19a, and 19b provided in the caliper 8. Accordingly, all the pistons 10 and 11 (one dual-purpose piston 10 and the three service-dedicated pistons 11) are pushed out from the cylinders 18a, 18b, 19a, and 19b, respectively, and the pair of pads 9a and 9b are pressed against both axial side surfaces of the rotor 1. As a result, the rotor 1 is strongly pressed from both axial sides so that braking is performed. In this manner, the opposed-piston type disc brake device 2a obtains the braking force by the service brake by pushing all the pistons 10 and 11 with introduction of hydraulic oil.

In contrast, during the parking brake by the opposed-piston type disc brake device 2a, the electric motor constituting the electric drive device 77 is energized and the spindle 70 constituting the thrust generating mechanism 42 is rotated. Accordingly, the nut 71 is displaced axially outward relative to the inner body 14. Then, the front end portion (axial outer end portion) of the nut 71 is pressed against the bottom 28 of the extension tubular portion 26 constituting the dual-purpose piston 10, so that the inner pad 9b is pressed against the axial inner side surface of the rotor 1 by the dual-purpose piston 10. Further, a reaction force caused by the pressing is transmitted from the spindle 70 to the clamp member 41 via the thrust bearing 74. Accordingly, the spindle 70 and the clamp member 41 are displaced axially inward relative to the caliper 8. At this time, the guide cylinder 22 and the housing hole 50, the inner guide pin 62 (sleeve 64) and the cylindrical portion 52, and the outer guide pin 67 and the support tubular portion 66 (elastic body 69) slide (relative movement) in the axial direction, respectively. Then, the outer pad 9a is pressed against the axial outer side surface of the rotor 1 by the pressing portion 43. As a result, the rotor 1 is strongly pressed from both axial sides so that braking is performed. In this manner, the opposed-piston type disc brake device 2a can obtain a braking force by simply driving the parking mechanism portion 12 which performs operation of a floating type brake and the like.

In order to release the parking brake, the spindle 70 is rotated by the electric motor reversely relative to the braking operation. Accordingly, the nut 71 is displaced axially inward relative to the inner body 14. Further, the clamp member 41 is displaced axially outward relative to the inner body 14 by displacing the spindle 70 axially outward relative to the inner body 14. At this time, the guide cylinder 22 and the housing hole 50, the inner guide pin 62 (sleeve 64) and the cylindrical portion 52, and the outer guide pin 67 and the support tubular portion 66 (elastic body 69) slide (relative movement) in the axial direction, respectively. Further, the dual-purpose piston 10 is displaced axially inward, that is, in a direction away from the rotor 1, by an elastic restoring force of the piston seals 33a and 33b. As a result, a clearance is ensured between the pair of pads 9a and 9b and two axial side surfaces of the rotor 1.

According to the opposed-piston type disc brake device 2a in the present embodiment as described above, it is possible to exhibit the two functions of the service brake and the parking brake with the disc brake device 2a alone. Accordingly, as compared with a case of providing dedicated devices separately, a size and a weight of the overall device can be reduced and a degree of freedom of a shape of the knuckle 4 can be improved.

That is, the opposed-piston type disc brake device 2a that functions as a hydraulic service brake is formed by combining the parking mechanism portion 12 that functions as a parking brake therewith. Further, the clamp member 41 constituting the parking mechanism portion 12 is supported to be mounted (radially superimposed) on the caliper 8, and a part (most of the nut 71 and an axial outer half portion of the spindle 70) of the thrust generating mechanism 42 constituting the parking mechanism portion 12 is disposed in the rotation-in inner cylinder 19a.

Therefore, as compared with a structure in which two devices dedicated to the service brake and the parking brake are separated or only connected in the circumferential direction, as in the case of the conventional structure illustrated in FIG. 18, it is possible to reduce the size and the weight of the overall device (particularly, a total length in the circumferential direction is reduced for the structure continuous in the circumferential direction). Further, it is possible to effectively reduce the total length in the circumferential direction as compared with the case of the structure continuous in the circumferential direction, since the pressing portion 43 has a shape (bifurcated shape) crossing the rotation-in outer cylinder 18a and the service-dedicated piston 11. It is possible to improve the degree of freedom regarding the shape of the knuckle 4 since only one mounting portion necessary for the knuckle 4 is required to support and fix the caliper 8. It is possible to reduce the number of pads (two pads are reduced as compared with the structure in FIG. 18) since the pair of pads 9a and 9b are commonly used in the service brake and the parking brake, and the weight and costs can also be reduced from this aspect.

Particularly, this embodiment adopts a support structure that supports the clamp member 41 constituting the parking mechanism portion 12 to the caliper 8 by the first guide portion 53, the second guide portion 54, and the third guide portion 55. Therefore, the clamp member 41 can be effectively prevented from tilting relative to the caliper 8 in the radial direction or in the circumferential direction when the parking brake is operated or released. Further, it is possible to effectively prevent twists or dragging from occurring between the female spline 27 and the male spline 76 or between the male screw portion 72 and the female screw portion 75. As a result, a rotational motion of the electric motor can be efficiently converted into a linear motion by the thrust generating mechanism 42, and the clamp member 41 can be smoothly displaced in the axial direction, so that the braking force by the parking brake can be stably obtained.

Further, the clamp member 41 can be prevented from rotating about the central axis of the guide cylinder 22 regardless of rotation of the electric motor (the spindle 70), since the second guide portion 54 is disposed in a position deviated from the first guide portion 53 and the third guide portion 55 in the circumferential direction. Therefore, in this embodiment, the clamp member 41 can be supported to be displaceable relative to the caliper 8 only in the axial direction. Further, it is possible to effectively prevent the pressing portion 43 provided in a position axially away from the first guide portion 53 from being displaced (vibrating) in the radial direction and in the circumferential direction, since the pressing portion 43 is supported to the outer body 13 by the third guide portion 55. Particularly, vibration of the clamp member 41 (pressing portion 43) in this embodiment as well as sliding resistance can be prevented more effectively, since the outer guide pin 67 is supported on the outer body 13 via the elastic body 69. Further, it is possible to prevent weight balance from collapsing due to the outer guide pin 67 since the third guide portion 55 and the first guide portion 53 are in the same circumferential positions and the outer guide pin 67 is disposed at a circumferential center of the pressing portion 43.

Further, as illustrated in FIG. 16, an axial inner side surface of the pressing portion 43 and an radial inner side surface of the bridge portion 45 can be arranged at a right angle, since the pressing portion 43 constituting the clamp member 41 and the bridge portion 45 are separated from each other and the pressing portion 43 and the bridge portion 45 are coupled to each other by the bolts 80. Therefore, the clamp member 41 can be disposed on the radial inner side while preventing interferences with the outer pad 9a compared to a case where the axial inner side surface of the pressing portion and the radial inner side surface of the bridge portion are connected by a concave arcuate curved surface portion, since the pressing portion and the bridge portion are integral. For this reason, the clamp member 41 can be effectively prevented from protruding radially outward from the caliper 8. Therefore, the radial width dimension of the opposed-piston type disc brake device 2a can be reduced, and the layout thereof can be improved.

The embodiment describes a structure in which the braking force by the parking brake is obtained by using an electric drive device, but the present invention is not limited thereto. That is, it is also possible to adopt a drive structure using a parking lever as disclosed in, for example, JP-A-2007-177995, as long as the braking force by the parking brake can be generated by driving of a parking mechanism portion. The number of pads to be used is not limited to two, and four or six may be provided, for example. A structure that combines a feed screw mechanism and a ball lamp mechanism as described in JP-A-2011-158058 can also be adopted as a thrust generating mechanism. When the braking force of the parking brake is obtained, it is also possible to adopt a configuration in which a pad disposed on an axial inner side of a rotor is directly pressed by an inner displacement member constituting the thrust generating mechanism. Further, it is also possible to adopt a configuration in which an axial inner side portion of an inner guide pin constituting a second guide portion is fixed to a clamp member, and an axial outer side portion of the inner guide pin is slidably inserted into an, inner body. Further, it is also possible to adopt a configuration in which an axial outer side portion of an outer guide pin constituting a third guide portion is fixed to an outer body, and an axial inner side portion of the outer guide pin is slidably inserted into a clamp member (pressing portion).

According to the opposed-piston type disc brake apparatus of the present invention, it is possible to realize a support structure for a clamp member of a disc brake device having two functions including a service brake and a parking brake by mounting a caliper constituting an opposed-piston type disc brake device on a clamp member, which enables a smooth axial displacement of the clamp member relative to the caliper.

What is claimed is:

1. An opposed-piston type disc brake device comprising:
   a caliper including an outer body and an inner body which are disposed on two sides of a rotor in an axial direction of the rotor and in which cylinders are respectively provided, and a pair of coupling portions which connect two circumferential side portions of the outer body and the inner body, and configured to be fixed to a suspension device;
   a plurality of pistons respectively fitted in the cylinders;
   a pair of pads, disposed on two sides of the rotor in the axial direction, and supported so as to be displaced relative to the caliper in the axial direction; and
   a parking mechanism portion including a clamp member and a thrust generating mechanism, wherein
   the clamp member includes a pressing portion on an axial outer side portion and a clamp base portion on an axial inner side portion,
   the clamp member is disposed between the pair of coupling portions in a circumferential direction, crosses the pair of pads and the inner body provided between the pressing portion and the clamp base portion from radially outside, and is supported to the caliper so as to be displaced relative to the caliper in the axial direction,
   the thrust generating mechanism includes an inner displacement member which is supported on the clamp base portion and is configured to be displaced axially inwardly relative to the caliper during braking operation, and an outer displacement member which is disposed in one of the cylinders provided in the inner body and is configured to be displaced axially outward relative to the caliper during braking operation,
   the cylinders are configured to receive a pressure oil so that a braking force by a service brake is generated, and the thrust generating mechanism is configured to be operated so that a braking force by a parking brake is generated, and
   a guide cylinder extending axially inward from an opening edge portion of the cylinder in which the outer displacement member is disposed is provided in the inner body at an axial inner side portion of the inner body,
   the clamp base portion includes a housing hole opened to an axial outer side of the clamp base portion in which the inner side displacement member is disposed, and
   the guide cylinder is fitted into the housing hole so as to relatively move in the axial direction, to form a first guide portion which supports the clamp member so that the clamp member is displaced relative to the cylinder in the axial direction.

2. The opposed-piston type disc brake device according to claim 1, wherein
   the guide cylinder, the inner displacement member, and the outer displacement member are coaxial with each other.

3. The opposed-piston type disc brake device according to claim 1, wherein
   the inner displacement member is a spindle having a male screw portion on an outer peripheral surface, and
   the outer displacement member is a nut having a female screw portion on an inner peripheral surface and screwed to the spindle.

4. The opposed-piston type disc brake device according to claim 1, further comprising:
   an elastic ring interposed between an outer peripheral surface of the guide cylinder and an inner peripheral surface of the housing hole.

5. The opposed-piston type disc brake device according to claim 1, further comprising:
   a dust cover bridged between the outer peripheral surface of the guide cylinder and an opening of the housing hole.

6. The opposed-piston type disc brake device according to claim 1, further comprising:
   a second guide portion disposed in a position deviated from the first guide portion in the circumferential direction, wherein
   the second guide portion supports the clamp member so that the clamp member is displaced relative to the caliper in the axial direction together with the first guide portion, and includes an inner guide pin disposed between the inner body and the clamp base portion in the axial direction.

7. The opposed-piston type disc brake device according to claim 6, wherein
   the inner guide pin is fixed to one of the inner body and the clamp base portion, and is slidably inserted into another one of the inner body and the clamp base portion.

8. The opposed-piston type disc brake device according to claim 7, wherein
   the inner guide pin is slidably inserted into the other one of the inner body and the clamp base portion via a sleeve.

9. The opposed-piston type disc brake device according to claim 7, wherein
   the caliper includes an intermediate coupling portion that axially connects a circumferential intermediate portion of the outer body and a circumferential intermediate portion of the inner body, and
   the inner guide pin is fixed at a same position as the intermediate coupling portion in the circumferential direction.

10. The opposed-piston type disc brake device according to claim 1, further comprising:
    a third guide portion, wherein
    the third guide portion supports the clamp member so that the clamp member is displaced relative to the caliper in the axial direction together with the first guide portion, and includes an outer guide pin disposed between the outer body and the pressing portion in the axial direction.

11. The opposed-piston type disc brake device according to claim 10, wherein
    the third guide portion is disposed at a same position as the first guide portion in the circumferential direction.

12. The opposed-piston type disc brake device according to claim 10, wherein
    the outer guide pin is fixed to one of the outer body and the pressing portion, and is slidably inserted into another one of the outer body and the pressing portion.

13. The opposed-piston type disc brake device according to claim 12, wherein
    the outer guide pin is slidably inserted into the other one of the outer body and the pressing portion via an elastic body.

14. The opposed-piston type disc brake device according to claim 1, wherein
    the clamp base portion includes a through hole communicated to the housing hole from an outer peripheral surface of the clamp base portion, and
    an opening of the through hole opened to the outer peripheral surface of the clamp base portion is closed by a stopper.

15. The opposed-piston type disc brake device according to claim 1, wherein
the clamp member includes a bridge portion which is disposed on a radial outer side of the rotor and connects the pressing portion and the clamp base portion in the axial direction, and
the bridge portion and the pressing portion are formed separately from each other.

16. The opposed-piston type disc brake apparatus according to acclaim 1, wherein
the clamp base portion includes an electric drive device configured to operate the thrust generating mechanism.

* * * * *